US012698005B2

(12) United States Patent
Zhou

(10) Patent No.: US 12,698,005 B2
(45) Date of Patent: *Aug. 4, 2026

(54) INFERRING GOOD USER PICKUP LOCATIONS FROM DETECTED WALKING PATHS

(71) Applicant: Waymo LLC, Mountain View, CA (US)

(72) Inventor: William Zhou, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 18/800,764

(22) Filed: Aug. 12, 2024

(65) Prior Publication Data

US 2024/0400105 A1 Dec. 5, 2024

Related U.S. Application Data

(63) Continuation of application No. 17/677,540, filed on Feb. 22, 2022, now Pat. No. 12,084,086.

(51) Int. Cl.
*B60W 60/00* (2020.01)
*G01C 21/00* (2006.01)
*G01C 21/34* (2006.01)

(52) U.S. Cl.
CPC ... *B60W 60/00253* (2020.02); *G01C 21/3461* (2013.01); *G01C 21/3807* (2020.08);
(Continued)

(58) Field of Classification Search
CPC ..... B60W 60/00253; B60W 2420/403; B60W 2420/408; B60W 2552/05;
(Continued)

(56) References Cited

U.S. PATENT DOCUMENTS 10,186,156 B2 1/2019 Sweeney et al.
10,359,295 B2 7/2019 Stroila et al.
(Continued)

OTHER PUBLICATIONS

The Extended European Search Report for European Patent Application No. 23155915.4, Jul. 18, 2923, 12 Pages.
(Continued)

*Primary Examiner* — Anne Marie Antonucci
*Assistant Examiner* — Wesam Almadhrhi
(74) *Attorney, Agent, or Firm* — Botos Churchill IP Law LLP

(57) ABSTRACT

The technology involves identifying suitable pickup and drop-off locations based on detected pedestrian walking paths. Mapped areas have specific physical configurations, which may suggest places to pick up or drop off a rider (or a delivery). A walking path heatmap can be generated based on obtained historical and/or real-time pedestrian-related information, which can be obtained by autonomous vehicles driving in areas of interest. Incorporating heatmap information into the evaluation, the system identifies locations for optimized pickup or drop-off in accordance with where pedestrians would likely go. One aspect involves classifying different objects, for instance identifying one or more objects as people who may be walking versus riding a bicycle. Once classified, information about the paths is used to obtain a the heatmap associated with the walking paths.

20 Claims, 23 Drawing Sheets

(52) U.S. Cl.
CPC ... *G01C 21/3841* (2020.08); *B60W 2420/403* (2013.01); *B60W 2420/408* (2024.01); *B60W 2552/05* (2020.02); *B60W 2552/45* (2020.02); *B60W 2554/4029* (2020.02); *B60W 2554/4042* (2020.02); *B60W 2555/60* (2020.02); *B60W 2556/10* (2020.02); *B60W 2556/40* (2020.02)

(58) Field of Classification Search
CPC ..... B60W 2552/45; B60W 2554/4029; B60W 2554/4042; B60W 2555/60; B60W 2556/10; B60W 2556/40; G01C 21/3461; G01C 21/3807; G01C 21/3841; G01C 21/3438

See application file for complete search history.

(56) References Cited

U.S. PATENT DOCUMENTS

| | | |
|---|---|---|
| 2013/0310080 A1 | 11/2013 | Palanki et al. |
| 2014/0277900 A1 | 9/2014 | Abhyanker |
| 2014/0278064 A1 | 9/2014 | Lee et al. |
| 2015/0219464 A1 | 8/2015 | Beaurepaire et al. |
| 2016/0307041 A1 | 10/2016 | Biswas et al. |
| 2018/0136656 A1 | 5/2018 | Rasmusson et al. |
| 2019/0122037 A1 | 4/2019 | Russell et al. |
| 2020/0174481 A1 | 6/2020 | Van Heukelom et al. |
| 2021/0108929 A1 | 4/2021 | Zhang et al. |
| 2021/0321938 A1 | 10/2021 | Hristov et al. |
| 2022/0012656 A1 | 1/2022 | Mubarek et al. |
| 2022/0188695 A1 | 6/2022 | Zhu et al. |

OTHER PUBLICATIONS

Busch, S. , et al., "Analysis of Spatio-Temporal Traffic Patterns Based on Pedestrian Trajectories", International Archives of the Photogrammetry, Remote Sensing and Spatial Information Sciences, vol. XLI-B2, 2016, pp. 497-503.

Ha, Eunji , et al., "Dimensions and Directions of Geospatial Industry", Geospatial World Forum, Green Score: an Evaluation Scheme for Pedestrian Environment, 2011, pp. 1-10.

Hara, Kotaro , et al., "The Design of Assistive Location-based Technologies for People with Ambulatory Disabilities: A Formative Study", People with Ambulatory Disabilities: A Formative Study, #chi4good, CHI 2016, San Jose, CA, USA, pp. 1757-1768.

Shah, Nitesh , et al., "TDOT Bicycle & Pedestrian Counting: Best Methodologies Assessment", TN Department of Transportation, 2020, pp. 1-130.

Sighencea, Bogdan Ilie , et al., "A Review of Deep Learning-Based Methods for Pedestrian Trajectory Prediction", Sensors 2021, 21, 7543. https://doi.org/10.3390/s21227543, pp. 1-29.

Wasswa, Banele , "The use of mobile phone technology in the collection of user perceptions of walkability along pedestrian routes from public transport in Cape Town and New Delhi", University of Cape Town, 2016, pp. 1-141.

Zhao, Junxuan , "Exploring the fundamentals of using infrastructure-based LiDAR sensors to develop connected intersections", Texas Tech University, 2019, pp. 1-131.

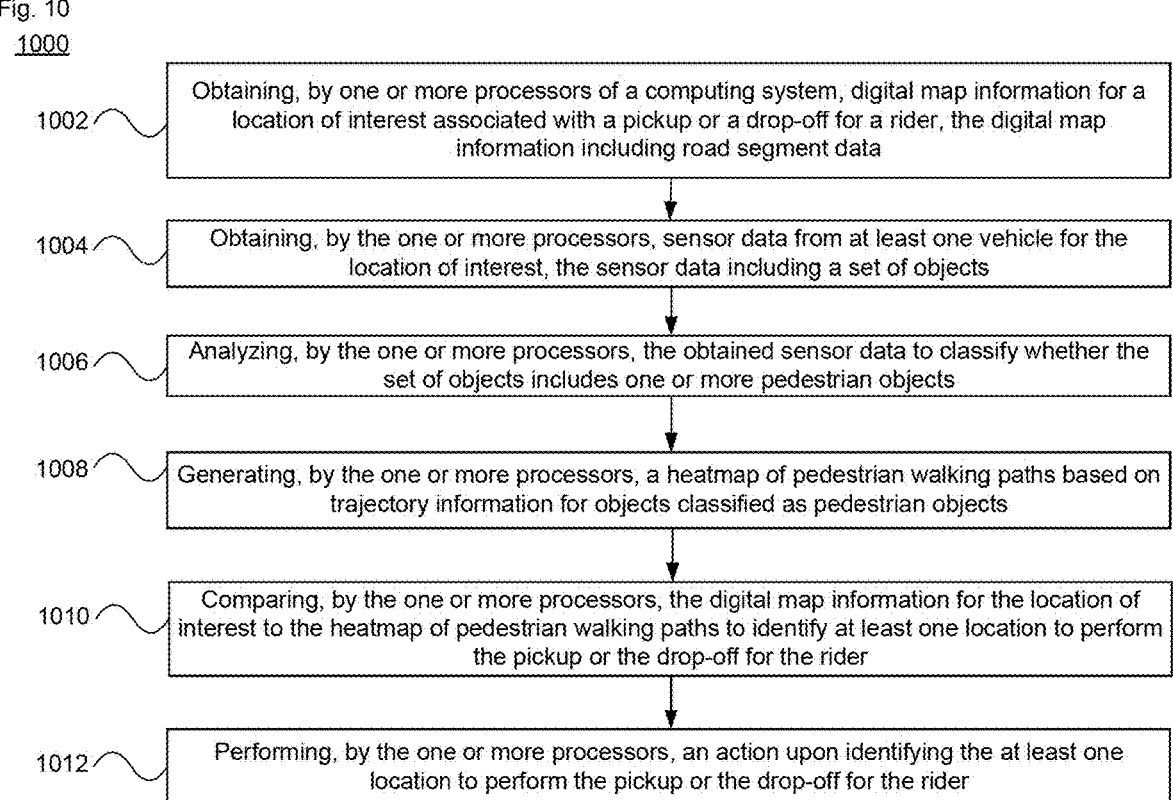

1002 — Obtaining, by one or more processors of a computing system, digital map information for a location of interest associated with a pickup or a drop-off for a rider, the digital map information including road segment data 1004 — Obtaining, by the one or more processors, sensor data from at least one vehicle for the location of interest, the sensor data including a set of objects 1006 — Analyzing, by the one or more processors, the obtained sensor data to classify whether the set of objects includes one or more pedestrian objects 1008 — Generating, by the one or more processors, a heatmap of pedestrian walking paths based on trajectory information for objects classified as pedestrian objects 1010 — Comparing, by the one or more processors, the digital map information for the location of interest to the heatmap of pedestrian walking paths to identify at least one location to perform the pickup or the drop-off for the rider 1012 — Performing, by the one or more processors, an action upon identifying the at least one location to perform the pickup or the drop-off for the rider

INFERRING GOOD USER PICKUP LOCATIONS FROM DETECTED WALKING PATHS

CROSS REFERENCE TO RELATED APPLICATIONS

The present application is a continuation of U.S. patent application Ser. No. 17/677,540, filed Feb. 22, 2022, the entire disclosure of which is incorporated herein by reference.

BACKGROUND

Autonomous vehicles, for instance, vehicles that may not require a human driver in certain driving situations, can be used to aid in the transport of passengers or items from one location to another. Such vehicles may operate in a fully autonomous mode where riders may provide some initial input, such as a pickup area or a destination, and the vehicle maneuvers itself to that area. However, an optimal pickup location may be difficult to determine, because there may be many different paths a rider can take to get to the pickup area. Selecting a suboptimal pickup location may make it harder for the rider to board, affect how the vehicle plans its driving route, or otherwise adversely affect the trip.

BRIEF SUMMARY

The technology relates to evaluating mapped areas that have specific physical configurations, as well as detected walking paths, in order to identify suitable pickup locations for riders. The mapped areas may be derived from satellite or other aerial imagery, or from other sources. The specific physical configurations can include sidewalks, crosswalks, curbs with and without ramps, stopping or loading zones, bicycle lanes, as well as traffic or safety barriers, fences, etc. Such mapped features by themselves may be used when considering different pickup locations for an autonomous vehicle. However, a richer and more complete set of data also includes detected walking paths.

For instance, a fleet of vehicles that are configured to operate in one or more autonomous driving modes may monitor their surroundings using various onboard sensors. Additionally or alternatively, location data from client devices may be shared with the vehicles for pickups. Using such detected or received information, the vehicles or a back-end fleet management system can identify actual historical walking paths. The walking paths may or may not conform to estimates based only on the physical configurations of the mapped areas or what may be feasible for the vehicle. Thus, incorporating this contextual information into the pickup evaluation, the system is able to identify pickup locations that may be optimized in accordance with where pedestrians would likely go.

According to one aspect, a method for identifying pickup or drop-off locations is provided in which, the method comprises obtaining, by one or more processors of a computing system, digital map information for a location of interest associated with a pickup or a drop-off for a rider, the digital map information including road segment data; obtaining, by the one or more processors, sensor data from at least one vehicle for the location of interest, the sensor data including a set of objects; analyzing, by the one or more processors, the obtained sensor data to classify whether the set of objects includes one or more pedestrian objects; generating, by the one or more processors, a heatmap of pedestrian walking paths based on trajectory information for objects classified as pedestrian objects; comparing, by the one or more processors, the digital map information for the location of interest to the heatmap of pedestrian walking paths to identify at least one location to perform the pickup or the drop-off for the rider; and performing, by the one or more processors, an action upon identifying the at least one location to perform the pickup or the drop-off for the rider.

Performing the action may include transmitting information to a client device of the rider, the information identifying the at least one location to perform the pickup or the drop-off. Alternatively or additionally, performing the action may include causing a vehicle operating in an autonomous driving mode to adjust driving operation in order to arrive at a selected one of the at least one location in order to perform the pickup or the drop-off for the rider. In these scenarios, the digital map information may further include one or more of intersection information, crosswalk placement, bicycle lane information, traffic signals information, or pullover zones information.

The sensor data may be historical sensor data obtained from trips previously taken by one or more vehicles operating in an autonomous driving mode. Alternatively, the sensor data may be obtained in real time by a vehicle currently operating in an autonomous driving mode. The trajectory information for the objects classified as pedestrian objects may include a set of positions for each pedestrian object at different points in time. For instance, the trajectory information may further include one or more of pose information, speed, acceleration or deceleration, or a rate of change of the acceleration or the deceleration. In one example, the heatmap of pedestrian walking paths is generated based on trajectory information for objects classified as pedestrian objects above a selected threshold probability. Alternatively or additionally, generating the heatmap of pedestrian walking paths may include performing a noise-smoothing operations on the trajectory information.

Comparing the digital map information to the heatmap to identify the at least one location may include: identifying a first set of possible locations based on the digital map information but not the heatmap; identifying a second set of possible locations based on the heatmap but not on the digital map information; and determining whether there are one or more common locations between the first and second sets of possible locations. Here, when there are one or more common locations, the method may include selecting those common locations as the at least one location to perform the pickup or the drop-off; and when there are no common locations, the method may include selecting at least one of the possible locations based only on the heatmap as the at least one location to perform the pickup or the drop-off. In another example, comparing the digital map information to the heatmap to identify the at least one location includes: identifying a set of possible locations according both to the digital map information and the heatmap; and weighting heatmap-based locations more heavily than digital map information-based locations.

The method may further comprise labeling the trajectory information for objects classified as pedestrian objects according to at least one of temporal information or ambient information. Here, identification of the at least one location to perform the pickup or the drop-off for the rider is based on the at least one of the temporal information or the ambient information. In addition, the identification based on the least one of the temporal information or the ambient information may include matching one or more labels against a set of current conditions for the location of interest.

According to another aspect, a vehicle is configured to operate in an autonomous driving mode, in which the vehicle comprises a perception system, a driving system, a positioning system and a control system. The perception system includes one or more sensors, the one or more sensors being configured to receive sensor data associated with objects in an external environment of the vehicle. The driving system includes a steering subsystem, an acceleration subsystem and a deceleration subsystem to control driving of the vehicle. The positioning system is configured to determine a current position of the vehicle. The control system includes one or more processors. The control system is operatively coupled to the driving system, the perception system and the positioning system. The control system is configured to: retrieve digital map information for a location of interest associated with a pickup or a drop-off for a rider, the digital map information including road segment data; obtain the sensor data associated with the objects in the external environment of the vehicle; analyze the obtained sensor data to classify whether the objects in the external environment include one or more pedestrian objects; generate a heatmap of pedestrian walking paths based on trajectory information for objects classified as pedestrian objects; compare the digital map information for the location of interest to the heatmap of pedestrian walking paths to identify at least one location to perform the pickup or the drop-off for the rider; and perform an action upon identifying the at least one location to perform the pickup or the drop-off for the rider. The action may be either: transmission of information to a client device of the rider, the information identifying the at least one location to perform the pickup or the drop-off; or to adjust a driving operation of the vehicle in order to arrive at a selected one of the at least one location in order to perform the pickup or the drop-off for the rider. Alternatively or additionally, the obtained sensor data may be at least one of camera imagery or lidar data.

And according to a further aspect, a computing system is provided which comprises memory configured to store digital map information for a location of interest and sensor data obtained from at least one vehicle for the location of interest, the digital map information including road segment data, and the sensor data including a set of detected objects; and one or more processors operatively coupled to the memory. The one or more processors are configured to: analyze the obtained sensor data to classify whether the set of detected objects includes one or more pedestrian objects; generate a heatmap of pedestrian walking paths based on trajectory information for objects classified as pedestrian objects; compare the digital map information for the location of interest to the heatmap of pedestrian walking paths to identify at least one location to perform a pickup or a drop-off for a rider; and provide at least one of the heatmap of pedestrian walking paths or the at least one location to one or more vehicles of a fleet of vehicles configured to operate in an autonomous driving mode. The one or more processors may be configured to analyze the obtained sensor data using one or more machine learning models trained to identify different types of objects. Here, classification of whether the set of detected objects includes one or more pedestrian objects includes application of labels to different types of pedestrian objects.

4

Figure 1A:
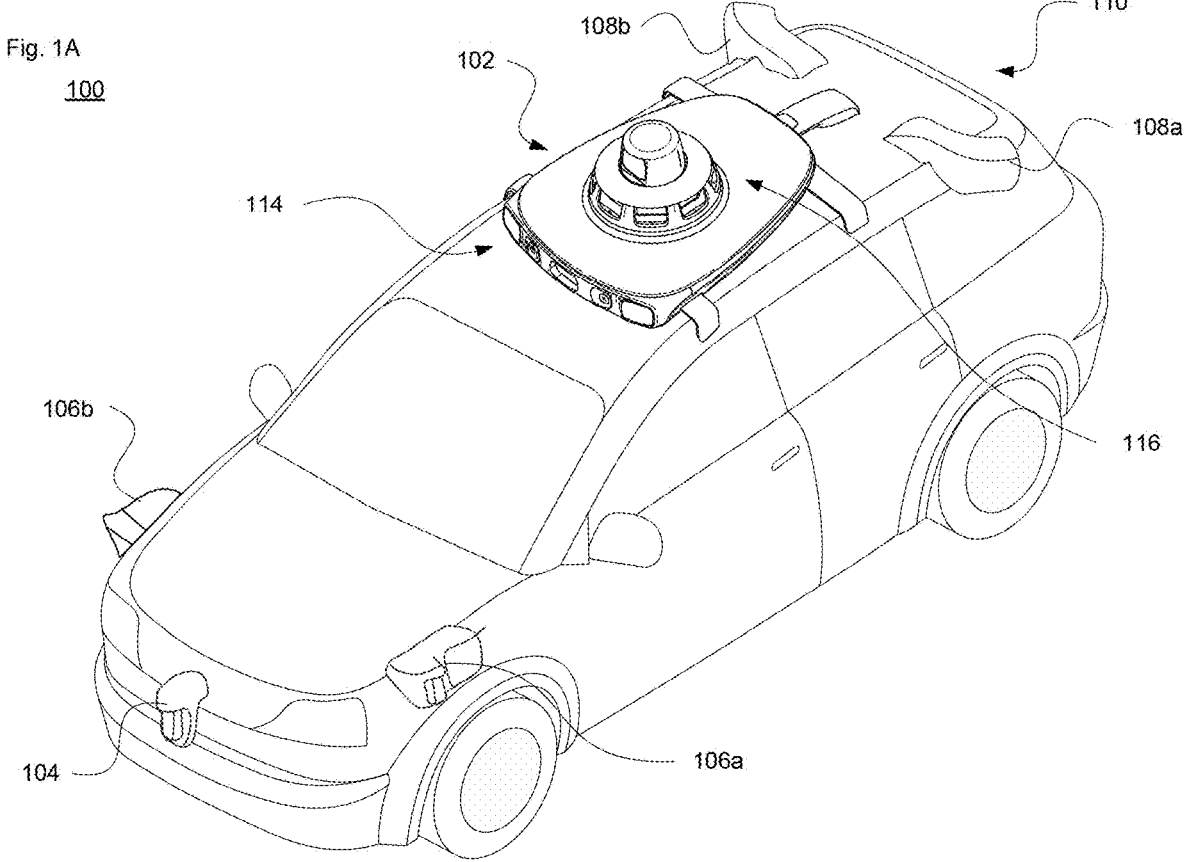
FIGS. 1A-B illustrate example autonomous vehicles in accordance with aspects of the technology.
Figure 1B:
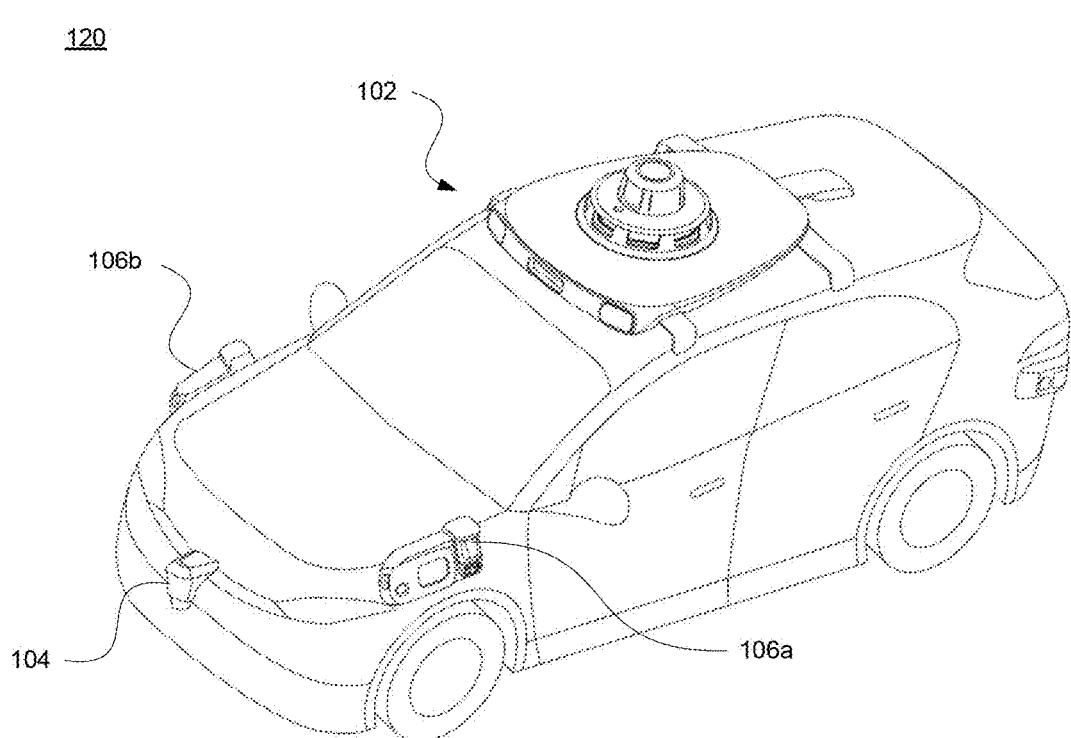
Figure 1C:
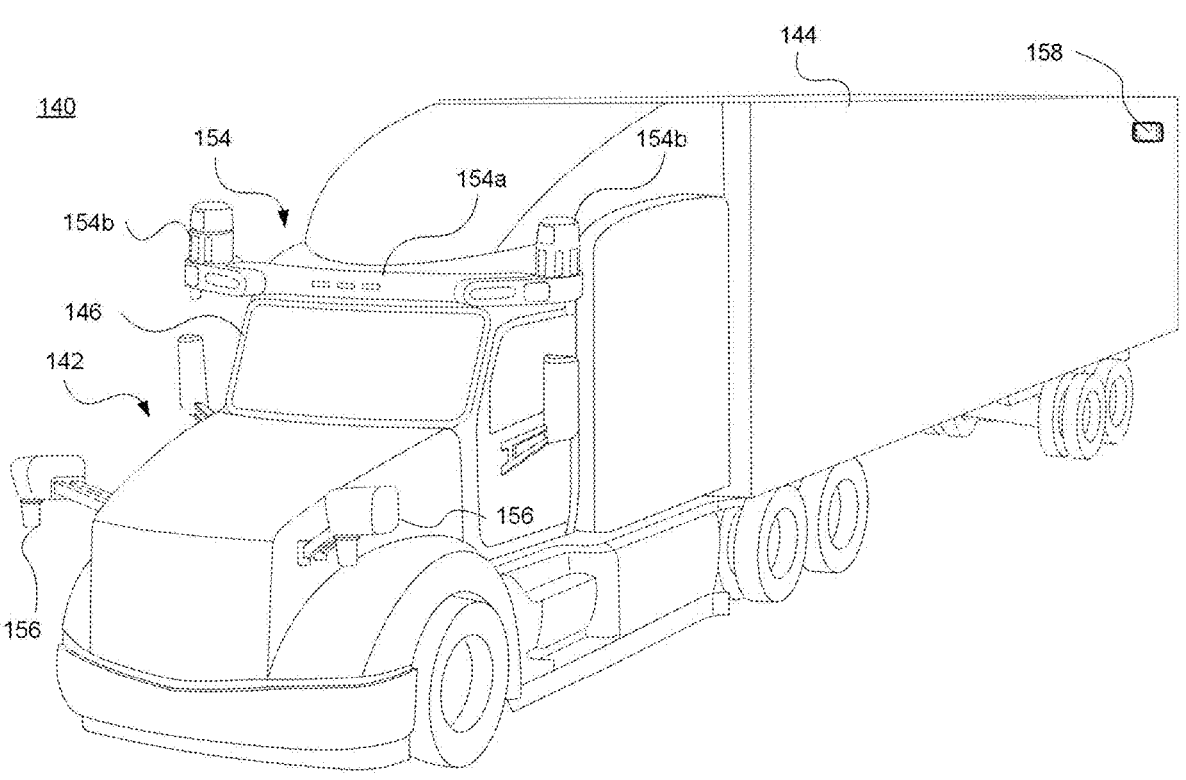
Figure 1D:
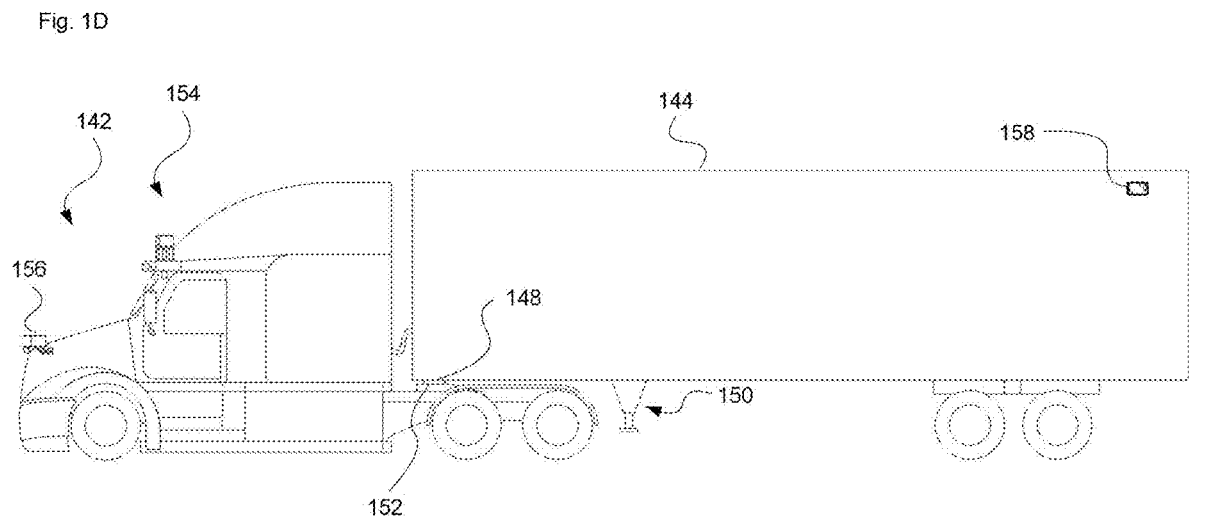
Figure 1E:
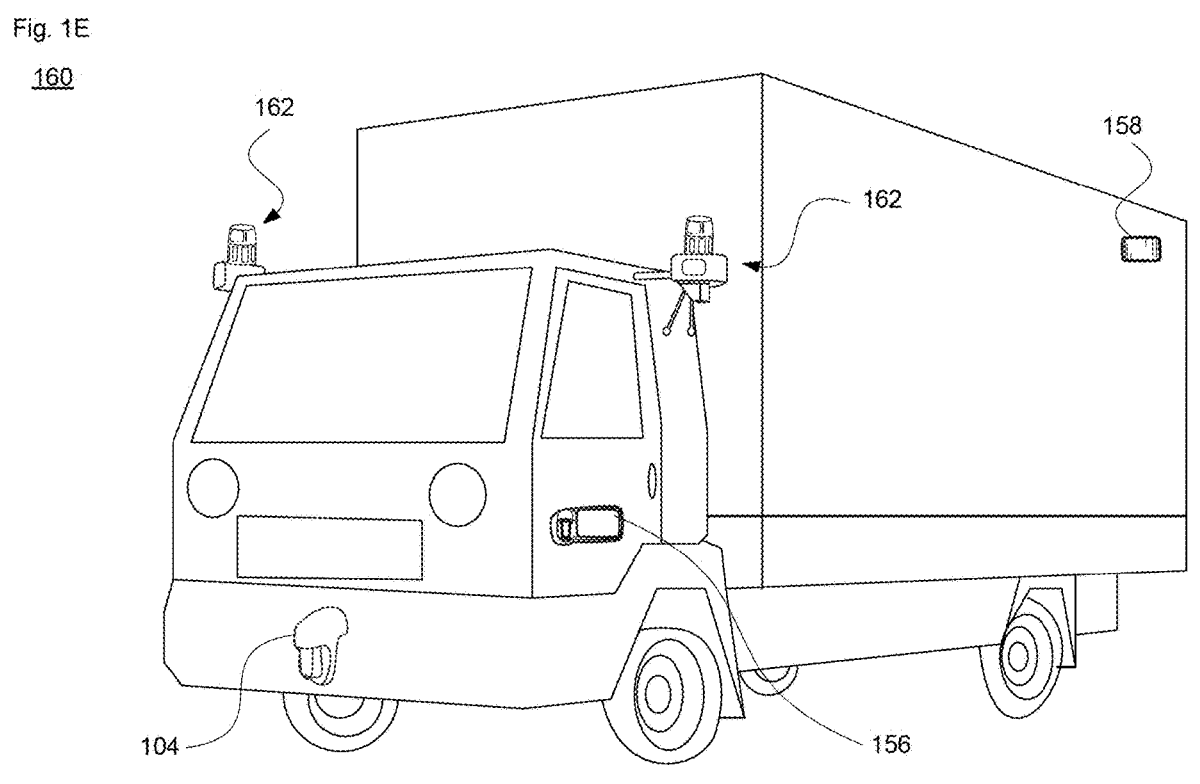

FIGS. 1C-E illustrate example cargo and delivery type vehicles configured for use with aspects of the technology.

Figure 2:
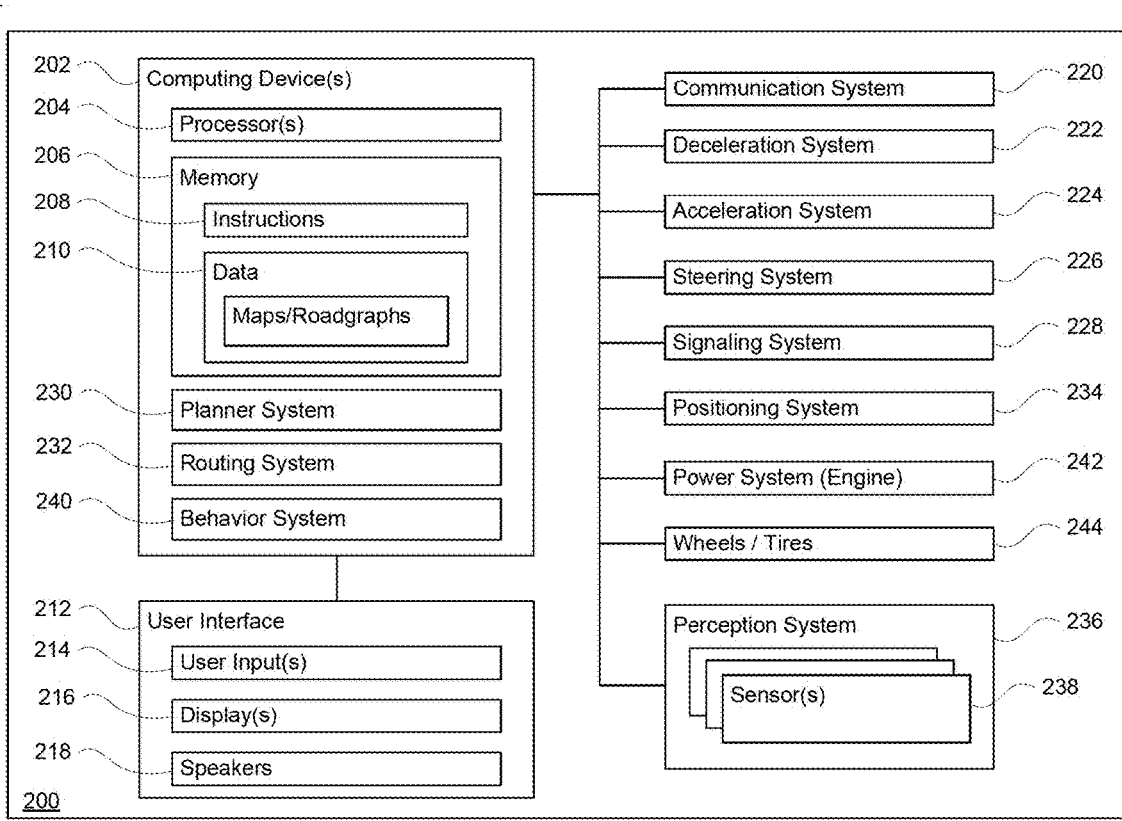

FIG. 2 illustrates components of a autonomous vehicle in accordance with aspects of the technology.

Figure 3A:
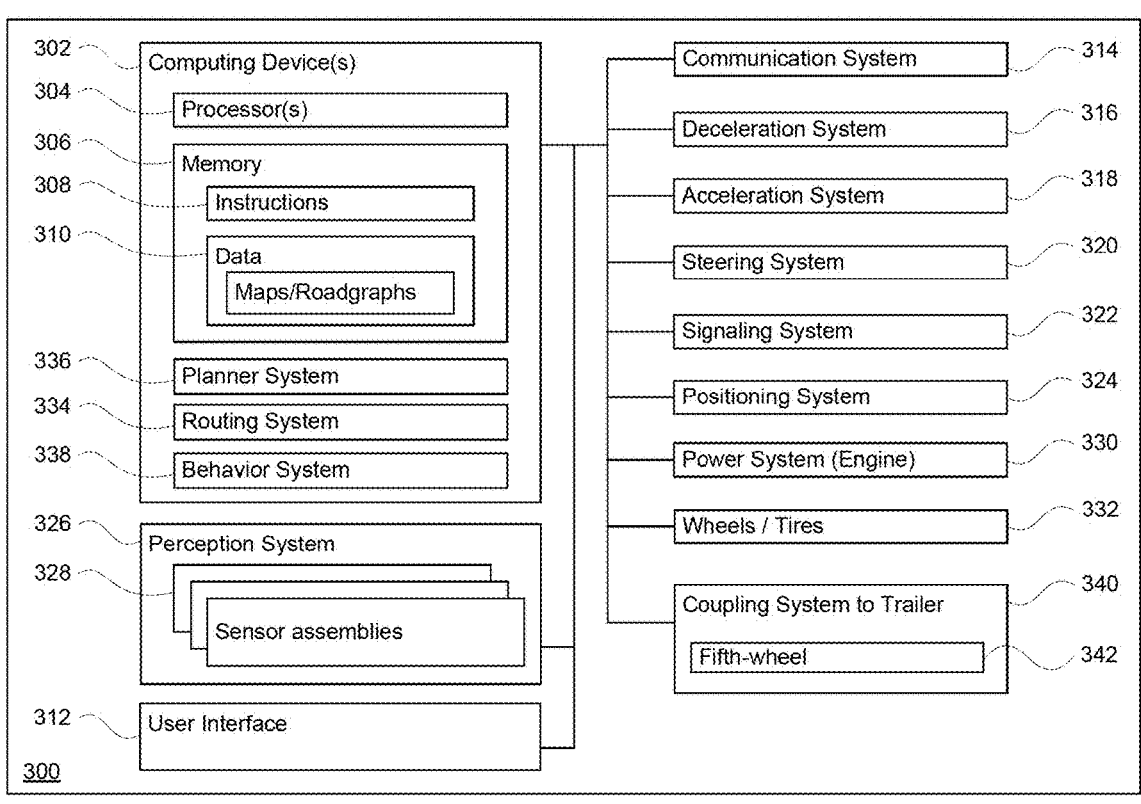
Figure 3B:
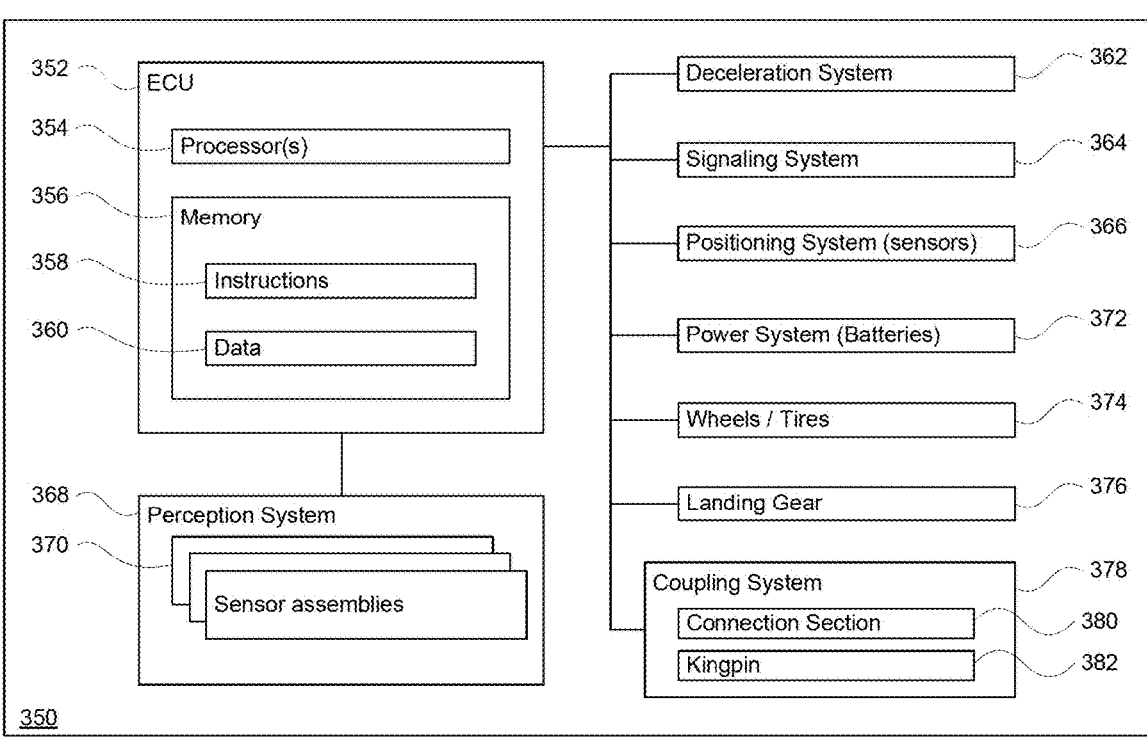

FIGS. 3A-B are block diagrams of systems of an example cargo-type vehicle in accordance with aspects of the technology.

Figure 4A:
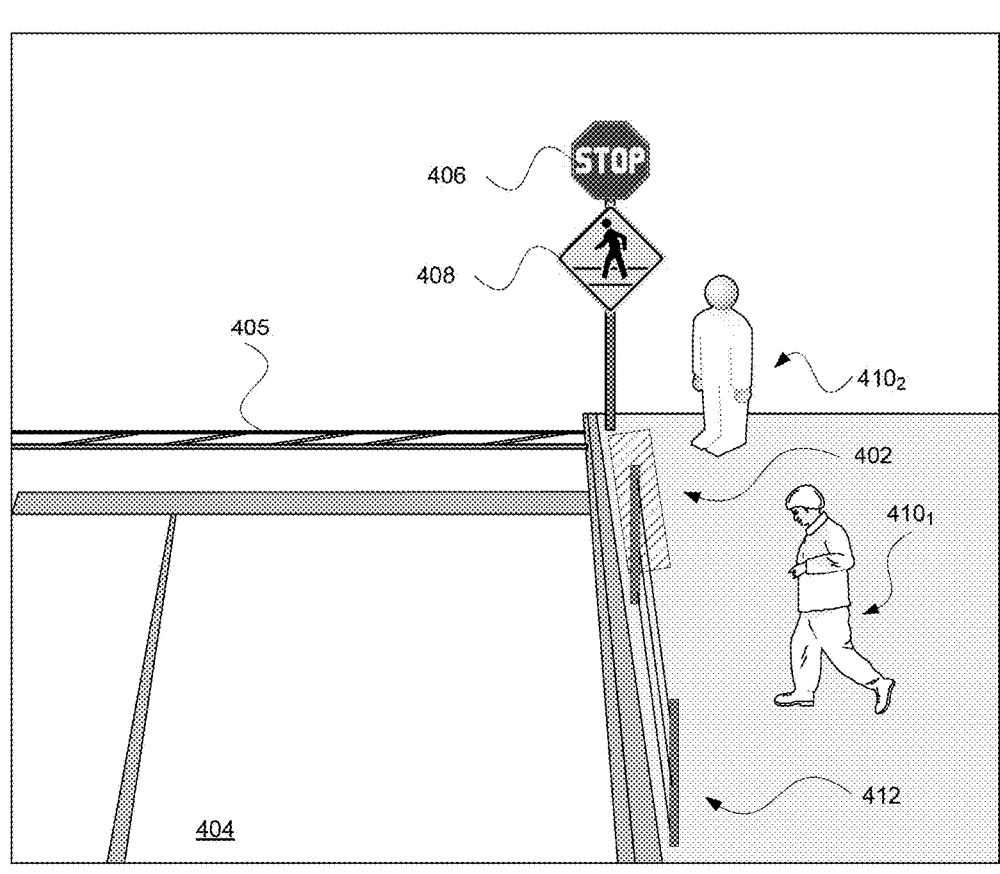
Figure 4B:
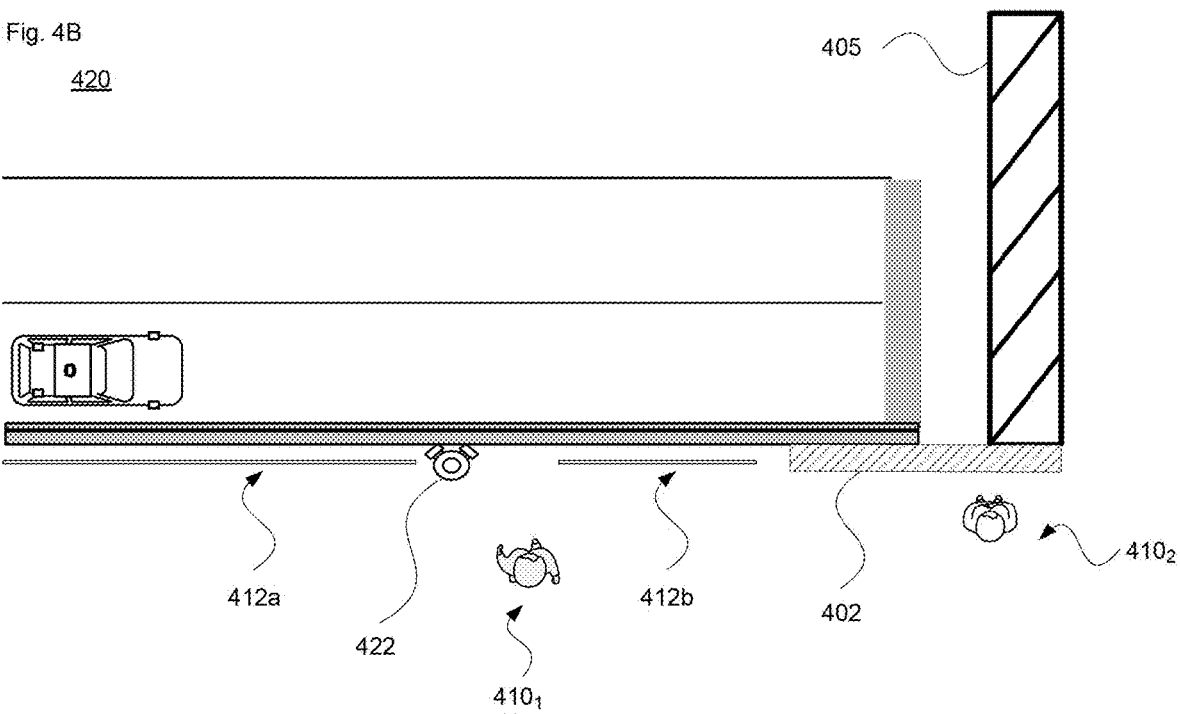
Figure 4C:
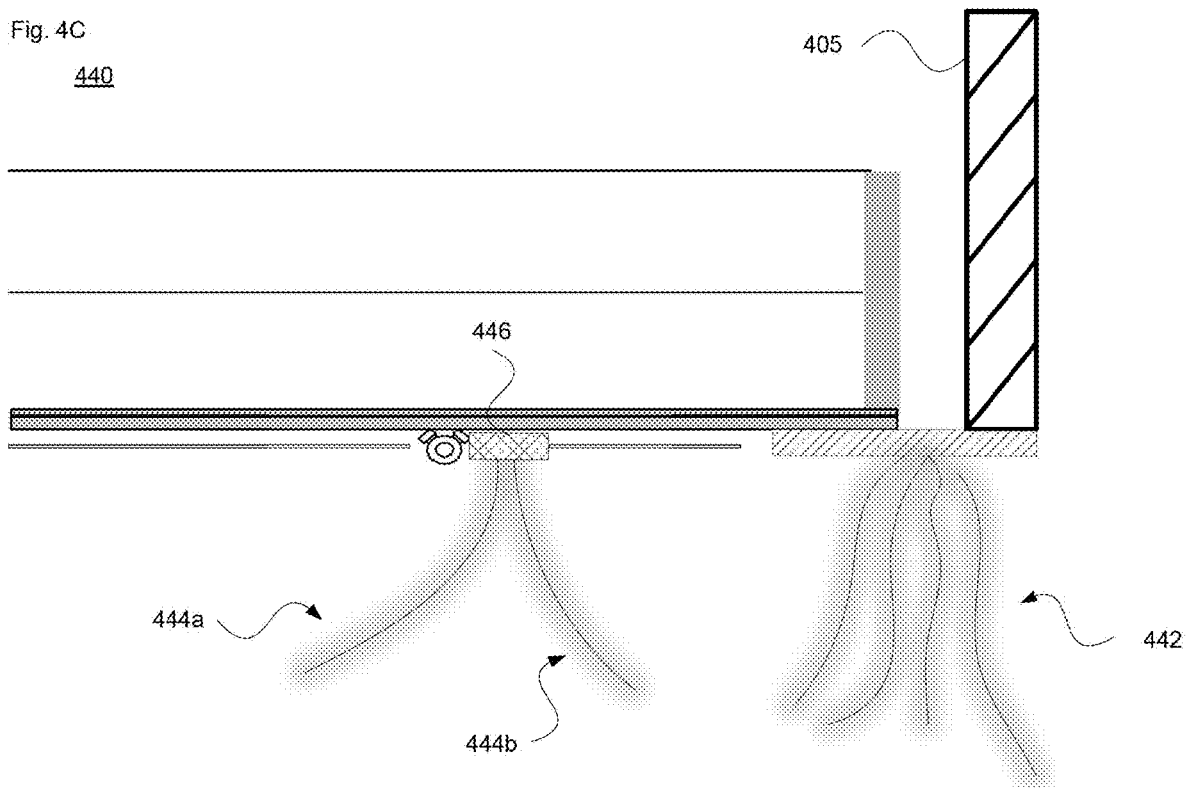

FIGS. 4A-C illustrate a pickup situation in accordance with aspects of the technology.

Figure 5:
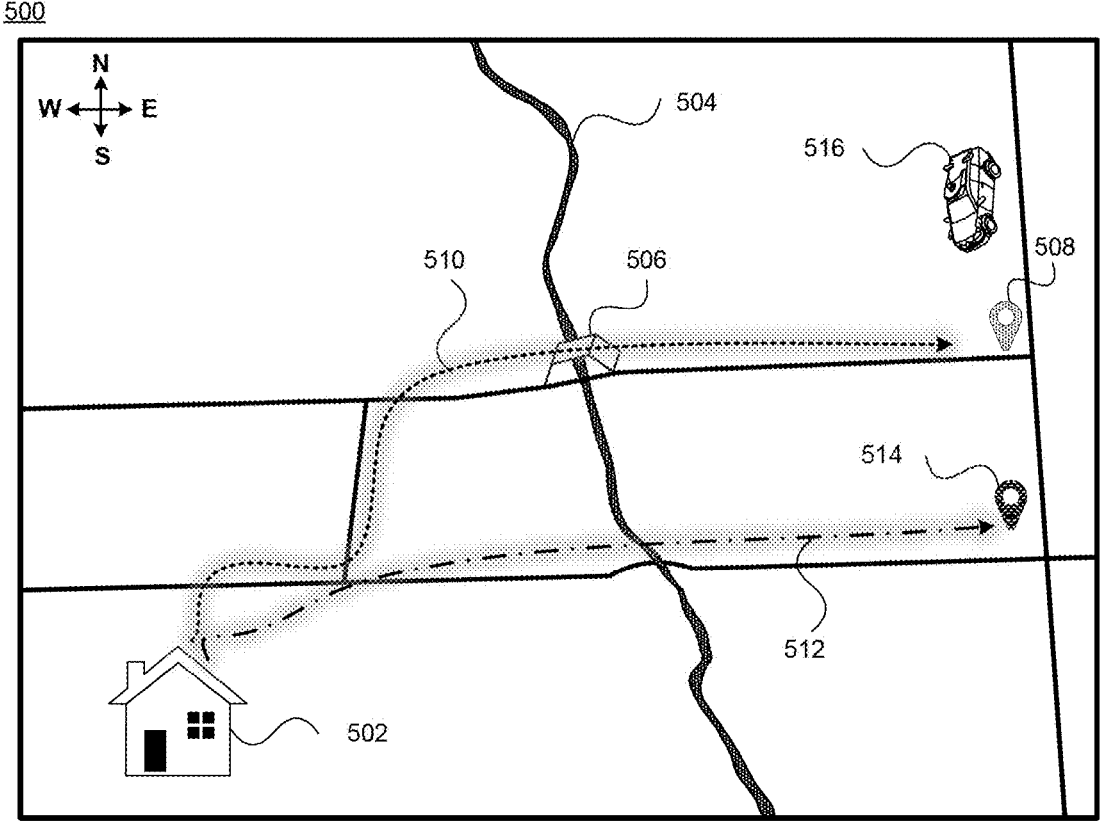

FIG. 5 illustrates another pickup situation in accordance with aspects of the technology.

FIGS. 6A-D illustrate heatmap and pickup location examples in accordance with aspects of the technology.

Figure 7A:
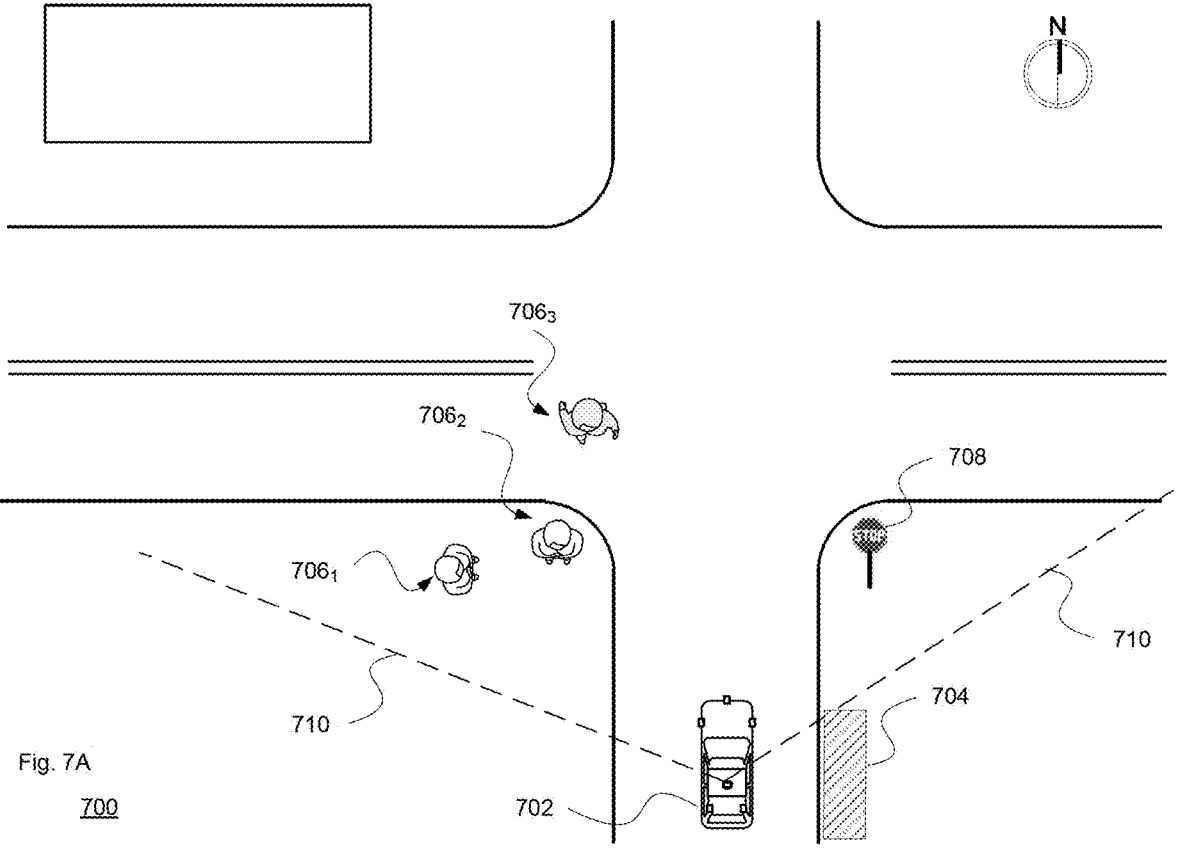
Figure 7B:
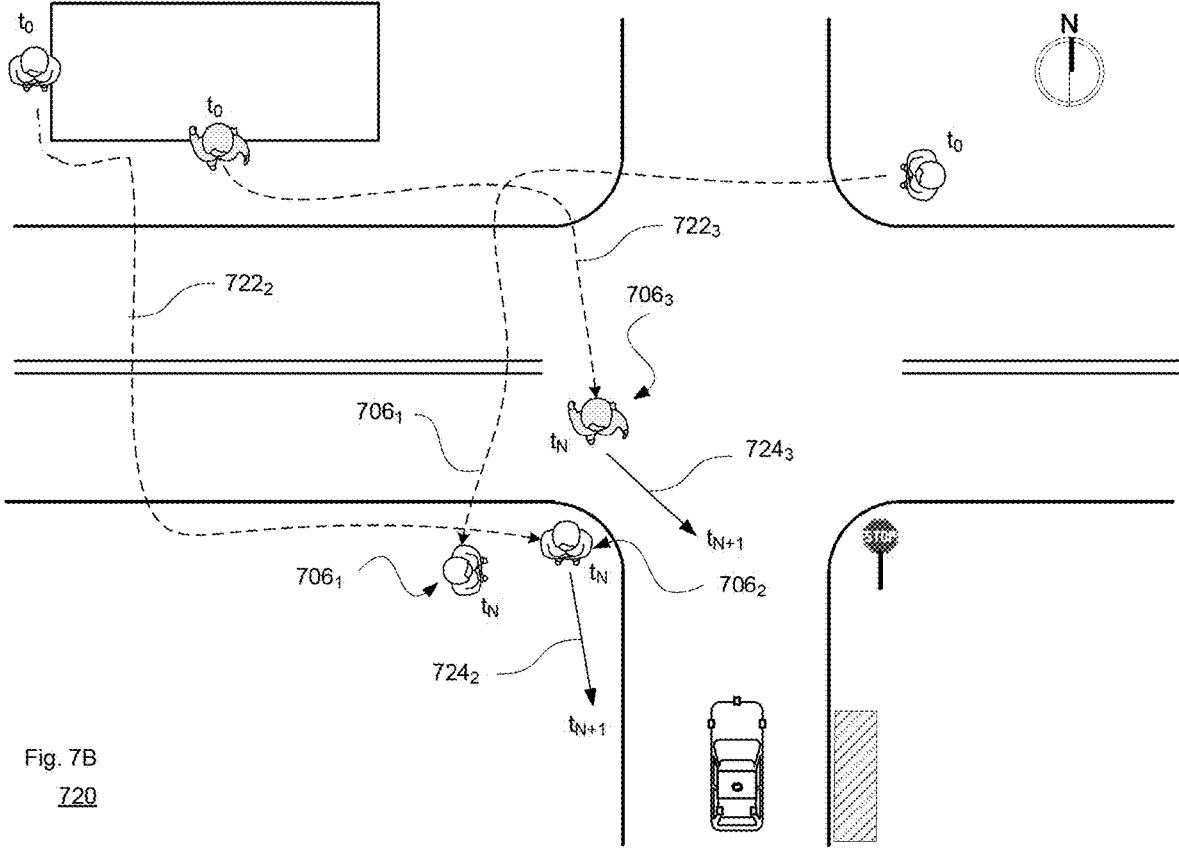

FIGS. 7A-B illustrate pedestrian object and path determination in accordance with aspects of the technology.

Figure 8A:
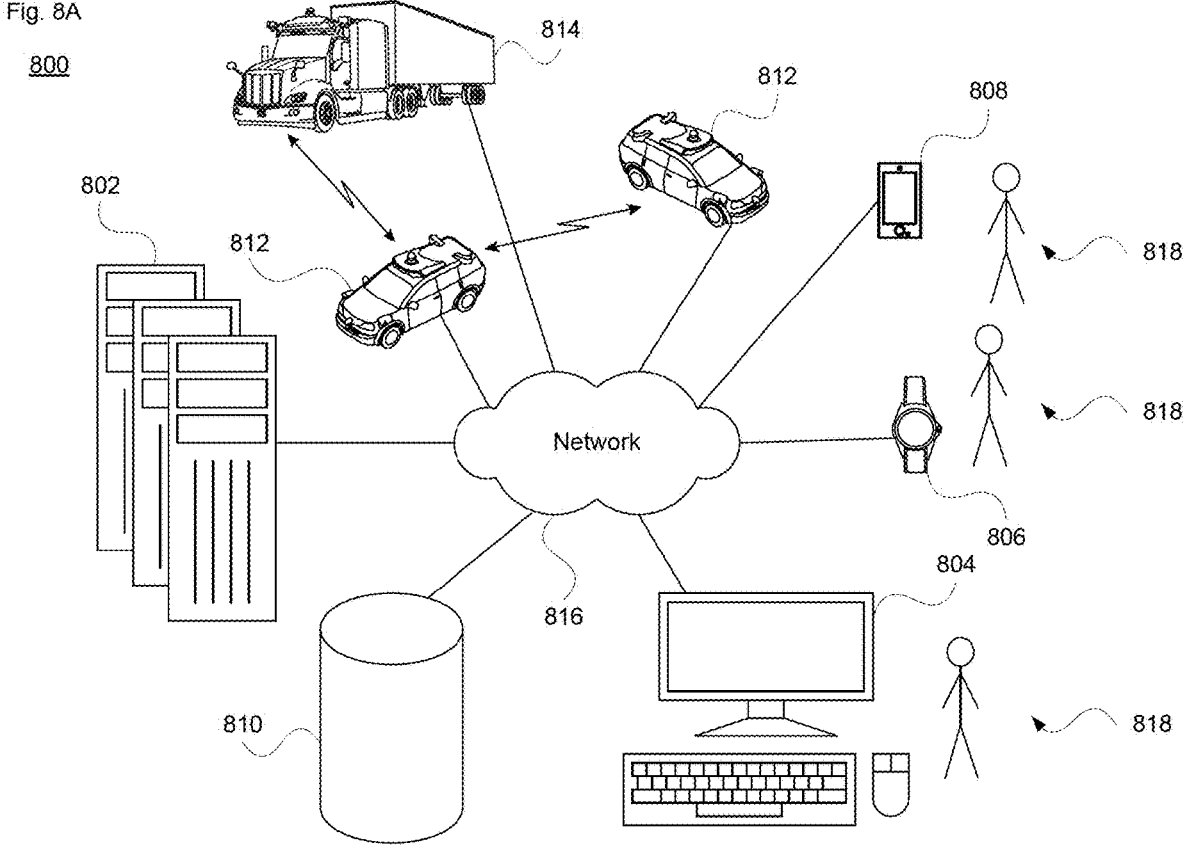
Figure 8B:
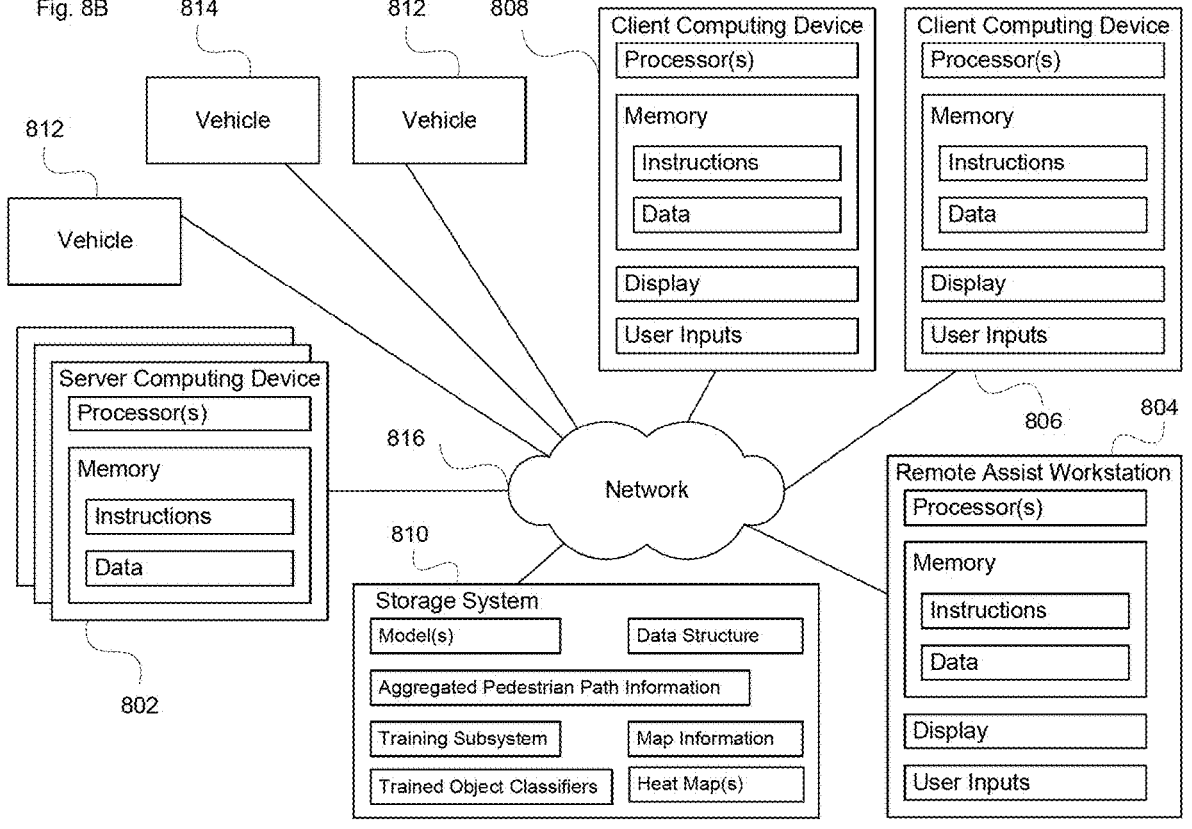

FIGS. 8A-B illustrate an example system in accordance with aspects of the technology.

Figures 9A, 9B:
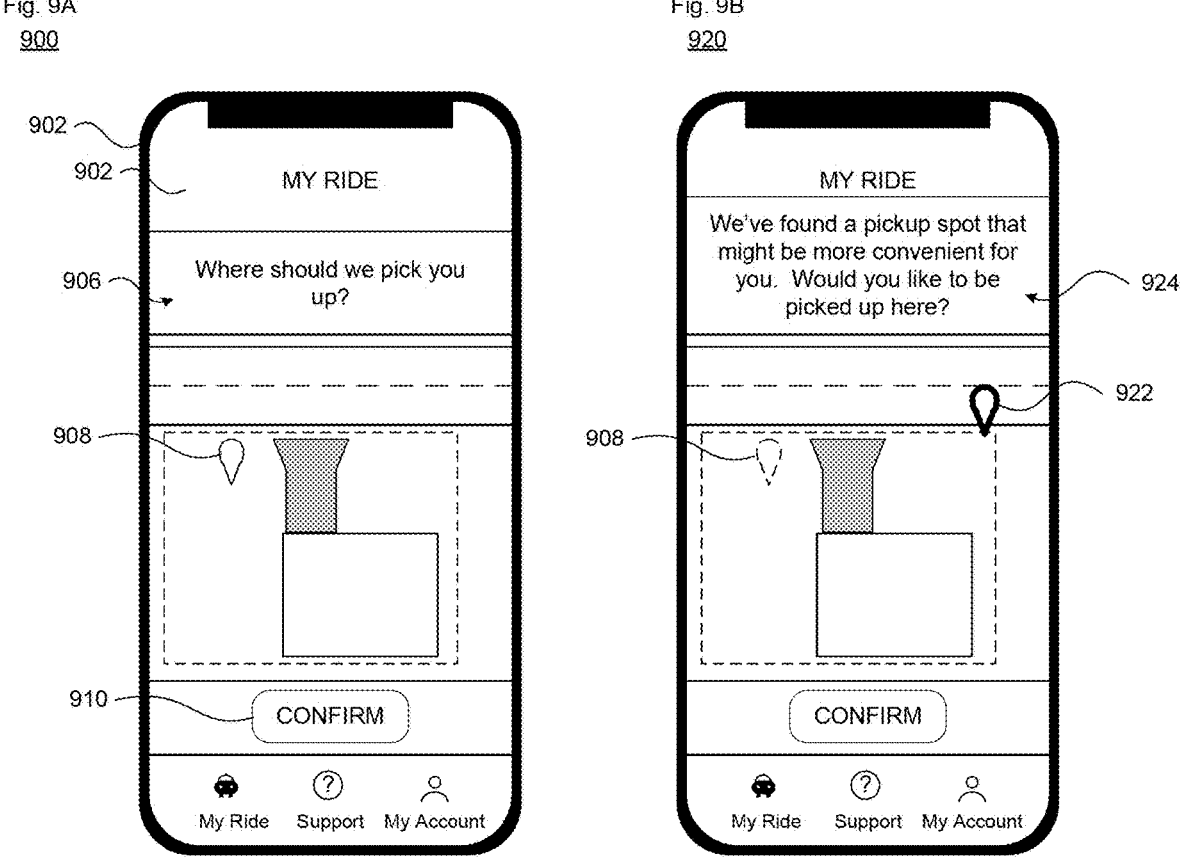
Figure 9C:
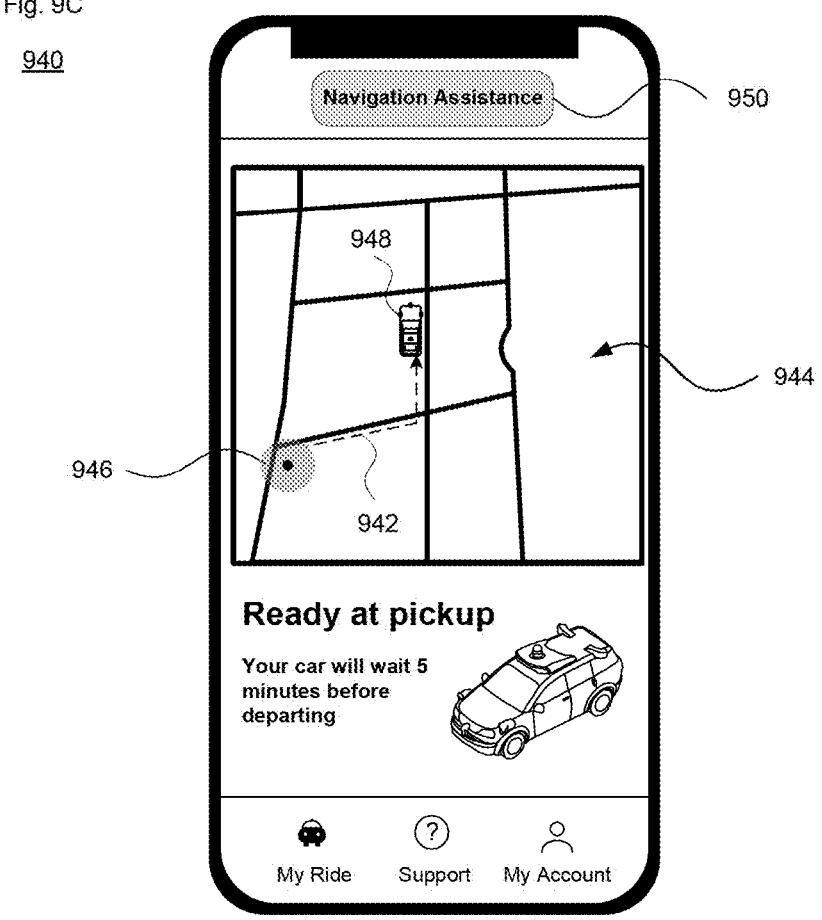

FIGS. 9A-C illustrate a pickup adjustment in accordance with aspects of the technology.

FIG. 10 illustrates an example method in accordance with aspects of the technology.

DETAILED DESCRIPTION

Inferring suitable pickup locations according to aspects of the technology is based on detected walking paths of pedestrians. This may include historical anonymized path information, real-time observed pedestrian trajectories, or both. A heatmap of detected walking paths can be generated based on such information, which can indicate where people tend to stop before crossing the street. The heatmap may be evaluated in conjunction with street-related map information, enabling an autonomous vehicle to select a particular pickup location and use a planner system of the vehicle to plan a route to that location. As a result, the system can pick up riders at locations that may be natural for riders walking toward a pickup area, but which may not be readily identifiable from the map information.

One aspect of the technology involves classifying different objects, for instance identifying one or more objects as people who may be walking alone, whether the person is an adult or a child, whether the person is a construction worker, whether they are pushing a stroller, using a wheelchair or crutches, carrying packages, pushing a handcart, toting luggage, riding a scooter, a bike or a skateboard, etc. (generally, "pedestrians"). Once classified, information about the paths the pedestrians have taken can be used to obtain an anonymized heatmap that shows the walking paths. In some scenarios, a fine-grained evaluation can be performed based on specific types of pedestrians, such as to identify which types of pedestrians use particular locations to cross a street. By way of example, a person pushing a stroller or in a wheelchair may cross at a crosswalk or intersection, whereas a person walking alone may cross mid-street. The vehicle may factor this type of information into account in order to identify where specifically to pull over at a pickup area.

Example Vehicle Systems

FIG. 1A illustrates a perspective view of an example passenger vehicle 100, such as a minivan or sport utility vehicle (SUV). FIG. 1B illustrates a perspective view of another example passenger vehicle 120, such as a sedan or crossover. The passenger vehicles may include various sensors for obtaining information about the vehicle's external environment. FIGS. 1C-D illustrate an example tractor-trailer type cargo vehicle 140. And FIG. 1E illustrates a smaller cargo vehicle 160, such as a panel truck for local deliveries.

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified autonomy different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed. In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode. The technology may be employed in all manner of vehicles configured to operate in an autonomous driving mode, including vehicles that transport passengers or items such as food deliveries, packages, cargo, etc. While certain aspects of the disclosure are particularly useful in connection with specific types of vehicles, the vehicle may be any type of vehicle including, but not limited to, cars, vans, motorcycles, cargo vehicles, buses, recreational vehicles, emergency vehicles, etc.

For instance, as shown in FIG. 1A, the vehicle may include a roof-top housing unit (roof pod assembly) 102 may include one or more lidar sensors as well as various cameras (e.g., optical or infrared), radar units, acoustical sensors (e.g., microphone or sonar-type sensors, ultrasonic sensors, or the like), inertial (e.g., accelerometer, gyroscope, etc.) or other sensors (e.g., positioning sensors such as GPS sensors). Housing unit 102 may have any number of different configurations, such as domes, cylinders, "cake-top" shapes, etc. Housing 104, located at the front end of vehicle 100, and housings 106a, 106b on the driver's and passenger's sides of the vehicle may each incorporate lidar, radar, camera, acoustical and/or other sensors. For example, housing 106a may be located in front of the driver's side door along a quarter panel of the vehicle. As shown, the passenger vehicle 100 also includes housings 108a, 108b for, e.g., radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

In this example, arrow 114 indicates that the roof pod 102 as shown includes a base section coupled to the roof of the vehicle. And arrow 116 indicated that the roof pod 102 also includes an upper section (e.g., with the dome, cylinder or cake-top shape) raised above the base section. Each of the base section and upper section may house different sensor units configured to obtain information about objects and conditions in the environment around the vehicle. The roof pod 102 and other sensor housings may also be disposed along vehicle 120 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

The example cargo vehicle 140 of FIGS. 1C-D is a tractor-trailer truck. The truck may include, e.g., a single, double or triple trailer, or may be another medium or heavy-duty truck such as in commercial weight classes 4 through 8. As shown, the truck includes a tractor unit 142 and a single cargo unit or trailer 144. The trailer 144 may be fully enclosed, open such as a flat bed, or partially open depending on the type of goods or other cargo to be transported. In this example, the tractor unit 142 includes the engine and steering systems (not shown) and a cab 146 for a driver and any passengers.

As seen in the side view of FIG. 1D, the trailer 144 includes a hitching point, known as a kingpin, 148, as well as landing gear 150 for when the trailer is detached from the tractor unit. The kingpin 148 is typically formed as a solid steel shaft, which is configured to pivotally attach to the tractor unit 142. In particular, the kingpin 148 attaches to a trailer coupling 152, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 154 and 156 disposed therealong. For instance, sensor unit 154 may be disposed on a roof or top portion of the cab. The sensor unit 154 may be a sensor suite having an elongated central member 154a with one or more types of sensors located therealong (e.g., camera and/or radar modules) and side members 154b that may include other sensor types (e.g., short range lidar modules capable of detecting objects within 10-25 meters of the vehicle and/or long range lidar modules capable of detecting objects beyond 15-20 meters and up to 100-250 meters). Sensor units 156 may be disposed on left and/or right sides of the cab. Sensor units may also be located along other regions of the cab, such as along the front bumper or hood area, in the rear of the cab, adjacent to the fifth-wheel, underneath the chassis, etc. The trailer 154 may also have one or more sensor units 158 disposed therealong, for instance along one or both side panels, front, rear, roof and/or undercarriage of the trailer 154.

The perspective view 160 of FIG. 1E illustrates an example panel truck or other vehicle that may be suitable for local deliveries (e.g., groceries, meals, mail or other packages, etc.). Here, in contrast to the roof-top housing unit 154 shown in FIGS. 1C-D, the truck 160 may have a pair of sensor assemblies disposed in housings 162 on either side of the vehicle.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

As shown in system diagram 200 of FIG. 2, the vehicle such as vehicle 100, 120 or 160 may have one or more computing devices, such as computing device 202 containing one or more processors 204, memory 206 and other components typically present in general purpose computing devices.

The memory 206 stores information accessible by the one or more processors 204, including and instructions 208 and data 210 that may be executed or otherwise used by the processor(s) 204. The memory 206 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 204 may be any conventional processors, such as commercially available CPUs, GPUs or TPUs. Alternatively, the one or more processors may include a dedicated device such as an ASIC or other hardware-based processor. Although FIG. 2 functionally illustrates the processor, memory, and other elements of computing device 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 202. Accordingly, references to a processor or computing device will be understood to include references to a collection of processors or computing devices or memories that may or may not operate in parallel.

Computing devices 202 may include all of the components normally used in connection with a computing device such as the processor and memory described above as well as a user interface 212 having one or more user inputs 214 (e.g., one or more of a button, mouse, keyboard, touch screen, gesture input and/or microphone), various electronic displays 216 (e.g., a monitor having a screen or any other electrical device that is operable to display information), and speakers 218 to provide information to a passenger of the autonomous vehicle or other people as needed. For example, electronic display 216 may be located within a cabin of autonomous vehicle 100, 120 or 160 and may be used by computing devices 202 to provide information to passengers or delivery personnel within the autonomous vehicle 100, 120 or 160.

Computing devices 202 may also include a communication system 220 having one or more wireless connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 202 may be part of an autonomous control system for the autonomous vehicle 100, 120 or 160 and may be capable of communicating with various components of the vehicle in order to control the vehicle in an autonomous driving mode. For example, computing devices 202 may be in communication with various systems of autonomous vehicle 100, 120 or 160, such as deceleration system 222, acceleration system 224, steering system 226, signaling system 228, planning system 230 (also referred to as a planning/trajectory module), routing system 232, positioning system 234 (for determining the position of the vehicle such as its pose, e.g., position and orientation along the roadway or pitch, yaw and roll of the vehicle chassis relative to a coordinate system), perception system 236 having one or more sensors 238, behavior modeling system 240 (also referred to as a behavior module), and power system 242 in order to control the movement, speed, etc. of autonomous vehicle 100, 120 or 160 in accordance with the instructions 208 of memory 206 in the autonomous driving mode.

As an example, computing devices 202 may interact with deceleration system 222 and acceleration system 224 in order to control the speed of the vehicle. Similarly, steering system 226 may be used by computing devices 202 in order to control the direction of autonomous vehicle 100, 120 or 160. For example, if autonomous vehicle 100, 120 or 160 is configured for use on a road, such as a car or truck, steering system 226 may include components to control the angle of wheels 244 to turn the vehicle. Some or all of the wheels/tires 244 are coupled to deceleration, acceleration and/or steering systems. The computing devices 202 may be able to receive information about tire pressure, balance and other factors that may impact driving in an autonomous mode. Computing devices 202 may also use the signaling system 228 in order to signal the vehicle's intent to other drivers or vehicles, for example, by lighting turn signals or brake lights when needed.

Routing system 232 may be used by computing devices 202 in order to generate a route to a destination using map information. Planning system 230 may be used by computing device 202 in order to generate short-term trajectories that allow the vehicle to follow routes generated by the routing system. In this regard, the planning system 230 and/or routing system 232 may store detailed map information, e.g., pre-stored, highly detailed maps identifying a road network including the shape and elevation of roadways, lane lines, intersections, crosswalks, bicycle lanes, speed limits, traffic signals, buildings, signs, real time traffic information (updated as received from a remote computing device, as such as the computing devices discussed below or other computing devices), pullover spots such as stopping or loading zones, vegetation, or other such objects and information. The map information may also include details about features adjacent to a roadway, such as curbs with or without ramps, as well as traffic or safety barriers, fences, etc.

The map information may derived from satellite imagery and/or may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 232 may use the aforementioned map information to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 234 may be used by computing devices 202 in order to determine the vehicle's relative or absolute position on a map or on the earth. For example, the positioning system 234 may include a GPS receiver or to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of a roadgraph as well as relative location information, such as location relative to other cars immediately around it, which can often be determined with less noise than the absolute geographical location.

The positioning system 234 may also include other devices in communication with computing devices 202, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 236 includes one or more components (sensors 238) for detecting objects external to the vehicle such as other road users (vehicles, pedestrians, bicyclists, etc.) obstacles in the roadway, traffic signals, signs, trees, buildings, etc. For example, the sensors 238 of the perception system 236 may include lidar, sonar, radar, cameras, microphones (e.g., in an acoustical array for instance arranged along the roof pod 102), pressure or inertial sensors, strain gauges, and/or any other detection devices that generate and/or record data which may be processed by the computing devices of computing devices 202. In the case where the vehicle is a passenger vehicle such as a minivan 100 or car 120, the vehicle may include lidar, cameras, and/or other sensors mounted on or near the roof, fenders, bumpers or other convenient locations as shown in FIGS. 1A-B.

Such sensors of the perception system 236 may detect objects in the vehicle's external environment and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 236 may also include other sensors within the vehicle to detect objects and conditions within the vehicle, such as in the passenger compartment or storage compartment (e.g., trunk). For instance, such sensors may detect one or more persons, pets, packages, etc., as well as conditions within and/or outside the vehicle such as temperature, humidity, etc. Still further, sensors 238 of the perception system 236 may measure the rate of rotation of the wheels 244, an amount or a type of braking by the deceleration system 222, and other factors associated with the equipment of the vehicle itself.

The raw data obtained by the sensors (e.g., camera imagery, lidar point cloud data, radar return signals, acoustical information, etc.) can be processed by the perception system 236 and/or sent for further processing to the computing devices 202 periodically or continuously as the data is generated by the perception system 236. Computing devices 202 may use the positioning system 234 to determine the vehicle's location and perception system 236 to detect and respond to objects and roadway information (e.g., signage or road markings) when needed to reach the location safely, such as by adjustments made by planner/trajectory module 230, including adjustments in operation to deal with sensor occlusions and other issues.

In some instances, object characteristics may be input into a behavior prediction system software module of the behavior modeling system 240 which uses various behavior models based on object type to output one or more predicted future behaviors for a detected object. Object trajectories may be a list of positions and orientations or headings (e.g., poses) as well as other predicted characteristics such as speed, acceleration or deceleration, rate of change of acceleration or deceleration, etc. In other instances, the characteristics obtained from the perception system 236 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system and/or a pedestrian detection system configured to detect emergency vehicles and pedestrians from sensor data generated by sensors of the vehicle. Each of these detection system software modules may use various models to output a likelihood of a construction zone or an object being an emergency vehicle, a pedestrian or other type of object.

Detected objects, predicted future behaviors, various likelihoods from detection system software modules, the map information identifying the vehicle's environment, position information from the positioning system 234 identifying the location and orientation of the vehicle, a destination location or node for the vehicle as well as feedback from various other systems of the vehicle may be input into a planning system software module of the planner system 230. The planner system 230 may use this input to generate trajectories for the vehicle to follow for some brief period of time into the future based on a route generated by a routing module of the routing system 232. In this regard, the trajectories may define the specific characteristics of acceleration, deceleration, speed, direction, etc. to allow the vehicle to follow the route towards reaching a destination. A control system software module of computing devices 202 may be configured to control movement of the vehicle, for instance by controlling braking, acceleration and steering of the vehicle, in order to follow a trajectory.

The computing devices 202 may control the vehicle in one or more of the autonomous driving modes by controlling various components. For instance, by way of example, computing devices 202 may navigate the vehicle to a destination location completely autonomously using data from the detailed map information and planner system 230. Computing devices 202 may use the positioning system 234 to determine the vehicle's location and perception system 236 to detect and respond to objects when needed to reach the location safely. Again, in order to do so, computing device 202 and/or planner system 230 may generate trajectories and cause the vehicle to follow these trajectories, for instance, by causing the vehicle to accelerate (e.g., by supplying fuel or other energy to the engine or power system 242 by acceleration system 224), decelerate (e.g., by decreasing the fuel supplied to the engine or power system 242, changing gears, and/or by applying brakes by deceleration system 222), change direction (e.g., by turning the front or rear wheels of autonomous vehicle 100, 120 or 160 by steering system 226), and signal such changes (e.g., by lighting turn signals) using the signaling system 228. Thus, the acceleration system 224 and deceleration system 222 may be part of a drivetrain that includes various components between an engine of the vehicle and the wheels of the vehicle. Again, by controlling these systems, computing devices 202 may also control the drivetrain of the vehicle in order to maneuver the vehicle autonomously.

FIG. 3A illustrates a block diagram 300 with various components and systems of a vehicle, e.g., vehicle 140 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information, e.g., roadgraphs and/or historical pedestrian path information that may be maintained as one or more heatmaps. The heatmaps may comprise, e.g., data correlating walking frequency, walking locations and road segments, which may be maintained as one or more tables or other data structures.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308. Here, as above, the system may include a user interface 312 having one or more user inputs, various electronic displays, and speakers.

In one example, the computing devices 302 may form an autonomous driving computing system incorporated into vehicle 140. Similar to the arrangement discussed above regarding FIG. 2, the autonomous driving computing system of block diagram 300 may be capable of communicating with various components of the vehicle in order to perform route planning and driving operations. Communication system 314 may provide one or more wireless connections in the manner described above for communication system 220. In addition or alternatively, the communication system may include the vehicle's internal communication bus (e.g., a Controller Area Network (CAN) bus or a FlexRay bus).

For example, the computing devices 302 may be in communication with various systems of the vehicle, such as a driving system including a deceleration system 316, acceleration system 318, steering system 320, signaling system 322, and a positioning system 324, each of which may function as discussed above regarding FIG. 2.

The computing devices 302 are also operatively coupled to a perception system 326 having one or more sensor assemblies 328, as well as a power system 330. Some or all of the wheels/tires 332 are coupled to the driving system, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information, routing system 334, planner system 336 and/or behavior system 338. For instance, computing devices 302 may employ a planner/trajectory module of the planner system 336 in conjunction with the positioning system 324, the sensor assemblies 328 of the perception system 326 and the routing system 334 to detect and respond to objects when needed to reach the location safely, similar to the manner described above for FIG. 2.

Similar to perception system 236, the perception system 326 also includes one or more sensors or other components such as those described above for detecting objects external to the vehicle, objects or conditions internal to the vehicle, and/or operation of certain vehicle equipment such as the wheels and driving system. Each sensor assembly 328 may include one or more sensors. In one example, a pair of sensor assemblies 328 may be arranged as sensor towers integrated into the side-view mirrors on the truck, farm equipment, construction equipment or the like. In another example, sensor assemblies 328 may also be positioned at different locations on the tractor unit 142 or on the trailer 144, as noted above with regard to FIGS. 1C-D. The computing devices 302 may communicate with the sensor assemblies located on both the tractor unit 142 and the trailer 144. Each assembly may have one or more types of sensors such as those described above.

Also shown in FIG. 3A is a coupling system 340 for connectivity between the tractor unit and the trailer. The coupling system 340 may include one or more power and/or pneumatic connections (not shown), and a fifth-wheel 342 at the tractor unit for mechanical connection to the kingpin at the trailer.

FIG. 3B illustrates a block diagram 350 of systems of an example trailer, such as trailer 144 of FIGS. 1C-D. As shown in this example, the system includes a trailer ECU 352 of one or more computing devices, such as computing devices containing one or more processors 354, memory 356 and other components typically present in general purpose computing devices. The memory 356 stores information accessible by the one or more processors 354, including instructions 358 and data 360 that may be executed or otherwise used by the processor(s) 354. The descriptions of the processors, memory, instructions and data from FIGS. 2 and 3A apply to these elements of FIG. 3B.

The trailer ECU 352 in this example is configured to receive information and control signals from the tractor unit, as well as information from various trailer components. The on-board processors 354 of the ECU 352 may communicate with various systems of the trailer, including a deceleration system 362, signaling system 364, and a positioning system 366. The ECU 352 may also be operatively coupled to a perception system 368 with one or more sensors arranged in sensor assemblies 370 for detecting objects in the trailer's driving environment. The ECU 352 may also be operatively coupled with a power system 372 (for example, a battery power supply) to provide power to local components. Some or all of the wheels/tires 374 of the trailer may be coupled to the deceleration system 362, and the processors 354 may be able to receive information about tire pressure, balance, wheel speed and other factors that may impact driving in an autonomous mode, and to relay that information to the processing system of the tractor unit. The deceleration system 362, signaling system 364, positioning system 366, perception system 368, power system 372 and wheels/tires 374 may operate in a manner such as described above with regard to FIGS. 2 and 3A.

The trailer also includes a set of landing gear 376, as well as a coupling system 378. The landing gear may provide a support structure for the trailer when decoupled from the tractor unit. The coupling system 378, which may be a part of coupling system 340 of FIG. 3A, provides connectivity between the trailer and the tractor unit. Thus, the coupling system 378 may include a connection section 380 (e.g., for communication, power and/or pneumatic links to the tractor unit). In this example, the coupling system also includes a kingpin 382 configured for connectivity with the fifth-wheel of the tractor unit.

Example Implementations

FIGS. 4A-B illustrate an example pickup situation. View 400 of FIG. 4A shows a pickup location 402 adjacent to a section of roadway 404, such as at the corner of the intersection. In this example, the pickup location 402 may be arranged when the rider to be picked up by an autonomous vehicle schedules a trip, for instance by using an app on their mobile phone or other client device (e.g., tablet PC, smartwatch, etc.). The app may be used to schedule the trip with an autonomous vehicle ride hailing service. The person scheduling the trip may select a pickup area, which may be adjusted by the rider or the service prior to the actual pick up time. The service may select which vehicle in a fleet is to pick up the rider. In this example, different objects on or adjacent to the roadway include crosswalk 405, a stop sign 406 and a pedestrian crossing sign 408, as well as different people 410₁ and 410₂, which may be detected as the vehicle approaches the pickup location 402. The detection may be done using one or more sensors of the vehicle's perception system, such as lidar and/or camera sensors.

Also shown in this view is a fence 412 adjacent to the curb. Map data, such as in a roadgraph, may indicate that the fence 412 blocks a length of the sidewalk adjacent to the curb. However, as seen in the top-down view 420 of FIG. 4B, the fence 412 may actually comprise two separate fence sections 412a and 412b with a gap in between due to a fire hydrant 422 that is not included in the roadgraph data. FIG. 4C illustrates another view 440, which shows a heatmap of the scene based on where pedestrians have historically gone, according to observed pedestrian trajectories. Here, paths 442 indicate that most pedestrians have moved along the sidewalk towards the intersection adjacent to the crosswalk 405. However, paths 444a and 444b indicate that other pedestrians, who may be coming from a different direction or from a particular store, shop or other building, have moved along the sidewalk to the spot along the curb where there is a gap between the two fence sections. Thus, while pickup location 402, which is based on the map information, may be suitable as a pickup spot, a different pickup location 446 (as indicated by the hatched area adjacent to the fire hydrant) may be a more appropriate pickup position for certain riders.

FIG. 5 illustrates another example where a suitable pickup location based on an actual walking path may differ from the options identified from map data. In this example, as shown in view 500, a rider (not shown) may request a pickup near to a dwelling 502. Based on map data showing a small river 504 with a bridge 506, the system may suggest pickup location 508, based on an assumption that a walking path 510 would be used to cross the bridge 506. However, as shown, a heat map of prior walking paths by pedestrians, according to observed pedestrian trajectories, may indicate two different paths, one being path 510 and the other being path 512, where there is a different way across the river. In the latter case, a different pickup location 514 may be more suitable, and may also be shorter in time and/or distance from the dwelling 502. Given this additional information, the ride may be arranged so that vehicle 516 will pick up the rider at location 514 rather than location 512.

FIGS. 6A-D illustrate another example for a parking lot. As shown in view 600 of FIG. 6A, parking lot 602 has a number of rows with parking spaced 604. The parking lot 602 provides parking for building 606, which has an entry-way 608. In this example, road 610 leads to and from the parking lot 602. A light 612 is located at an intersection (not shown), and a crosswalk 614 is connected to the parking lot 602. A bicycle rack 616 is shown in an area 618 adjacent to the parking lot and the entryway 608. Some or all of these features may be included in a detailed digital map (e.g., a roadgraph), which may be derived from satellite or other imagery, as well as other sources. Based on this map-related information, as shown in view 620 of FIG. 6B the system may identify region 622 as a pickup spot for pickups at the building 606, and region 624 for pickups across from the parking lot 602.

Figure 6A:
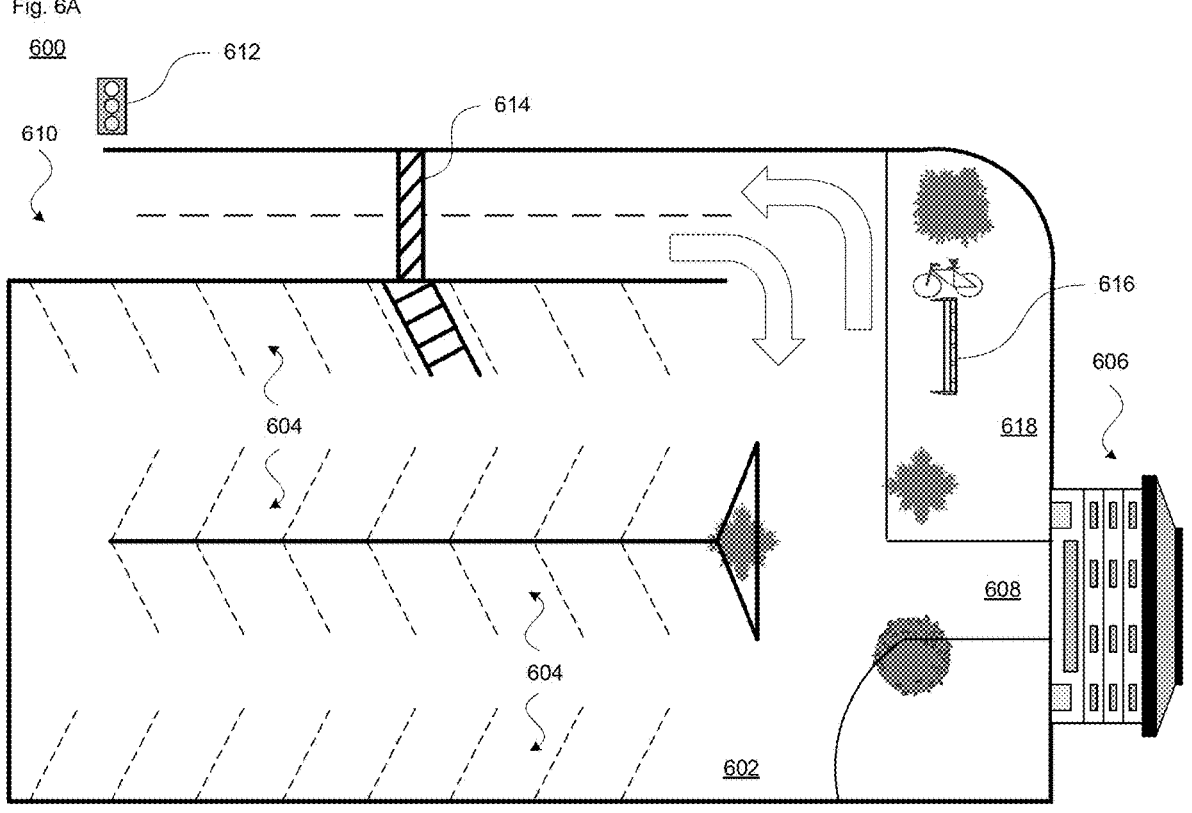
Figure 6B:
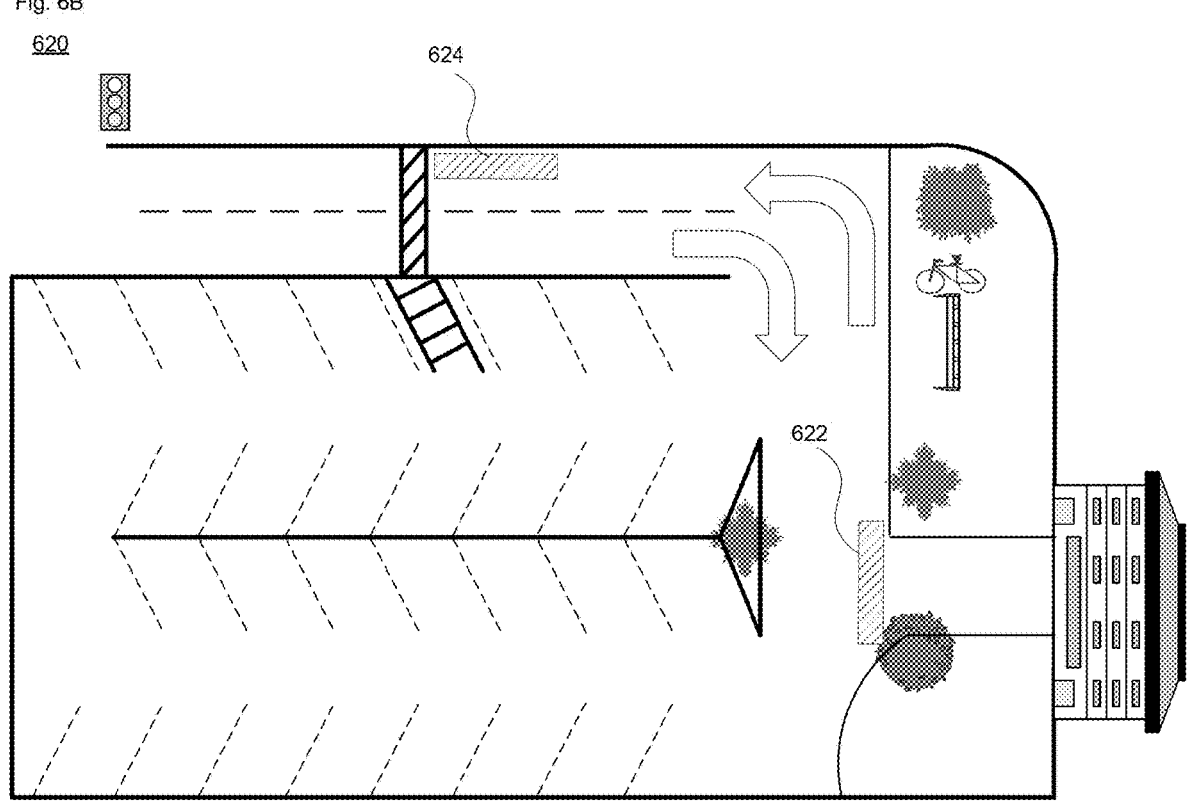
Figure 6C:
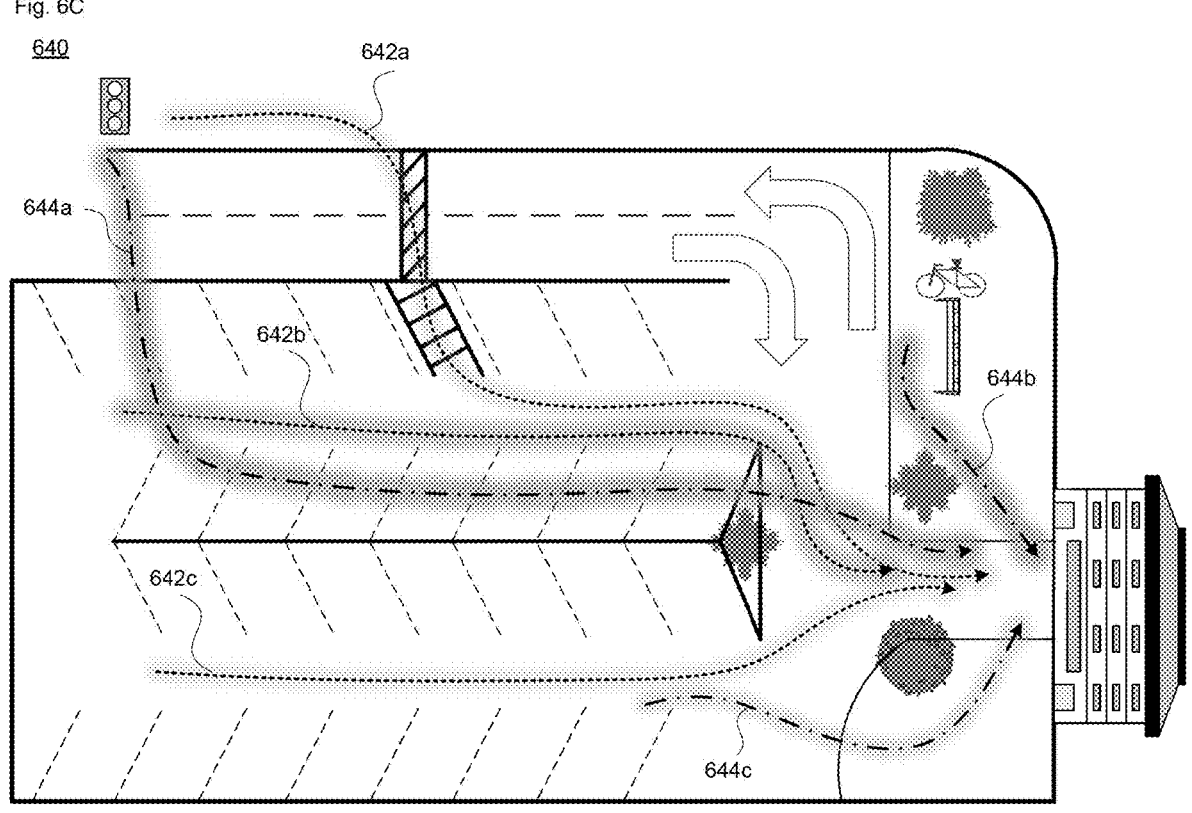
Figure 6D:
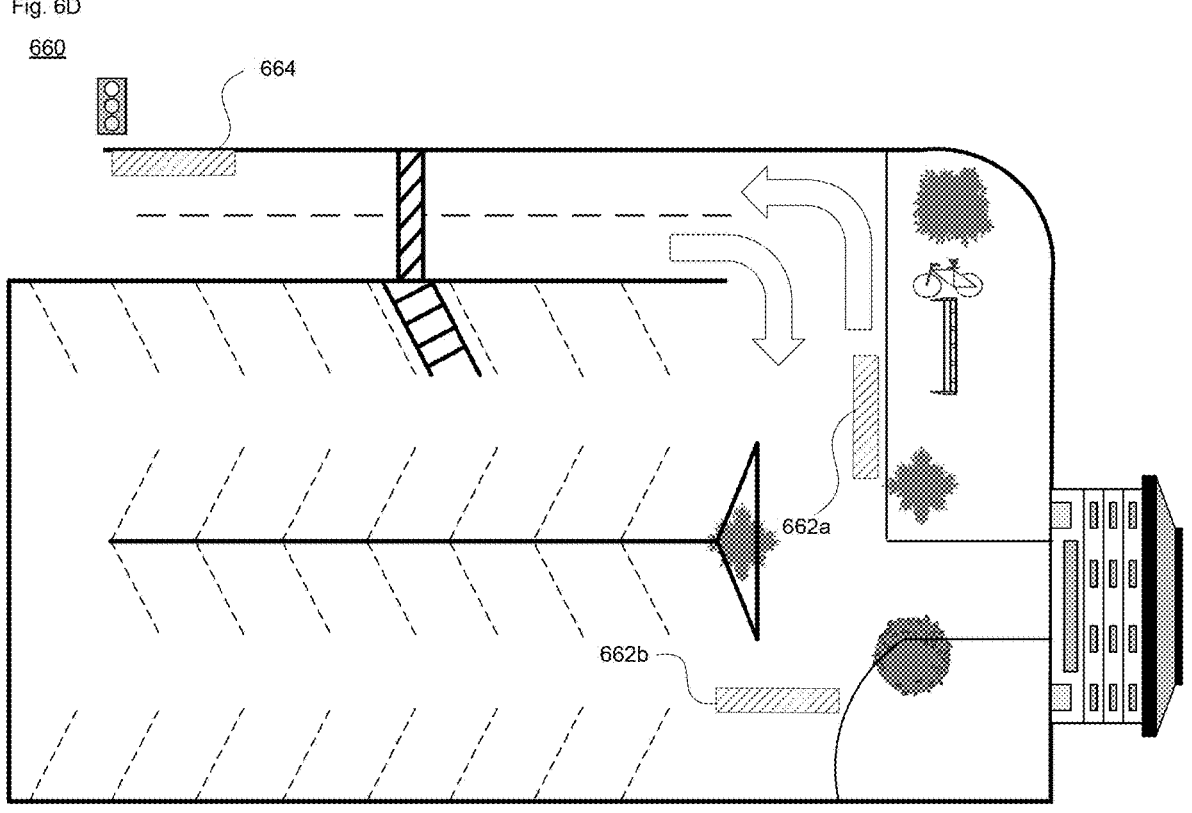

FIG. 6C illustrates a heatmap view 640 showing pedestrian paths through or adjacent to the parking lot. Here, paths 642a, 642b and 642c are shown in dotted lines. Path 642a shows that pedestrians used the crosswalk into the parking lot to arrive at the building entrance, while paths 642b and 642c show that pedestrians, who may have parked in the parking lot or been dropped off in the parking lot, walked down different aisles toward the building entrance. Paths 644a, 644b and 644c of the heatmap are shown in dash-dot lines. Here, path 644a shows that some pedestrians crossed the road into the parking lot close to the light rather than at the crosswalk. Path 644b indicates that other pedestrians walked to the building entrance past the bicycle rack rather than through the parking lot. And path 644c shows that other pedestrians made a short walk through a part of the parking lot, entering the building via a side of the entryway. As shown in this example, the shading of paths 642b, 644a and 644b is heaviest, indicating that those paths are the most frequently used by pedestrians. Given this, as shown in view 660 of FIG. 6D, instead of locations 622 and 624 the system may instead select pickup location 662a adjacent to the bicycle rack, pickup location 662b in the corner of the parking lot near the entryway, or pickup location 664, which is closer to the streetlight than the crosswalk.

Heatmap Generation

As explained above, a vehicle operating in an autonomous driving mode employs one or more types of sensors to detect objects and obtain other information about the vehicle's surrounding environment. This may include, but is not limited to, camera imagery, lidar point cloud data, radar signal returns, acoustical information, ambient condition information (e.g., temperature and humidity), road surface conditions (e.g., wet or icy), etc. Such sensor information can be used to make short-term driving decisions over the next few seconds, e.g., to brake or change lanes in the next 1-10 seconds. The information may be buffered for temporary storage, although some of the data may be saved locally or transmitted to a back-end system for further evaluation, which can be particularly helpful when evaluating new driving situation or an "edge case" that may rarely happen in daily operation.

The detected object information from one or more autonomous vehicles may also be used to identify paths taken by pedestrians in a given area of interest. For instance, FIG. 7A shows an example scene 700, in which vehicle 702 is currently adjacent to a location 704, which may be a pickup or drop-off location for a rider. In this example, various objects in the nearby environment have been detected, namely objects 706₁, 706₂ and 706₃, and object 708, which are within a field of view (denoted by the pair of dashed lines) of one or more of the vehicle's sensors. In this example, using one or more machine learning models trained to identify different types of objects, the objects 706 may be classified as pedestrian objects, while object 708 may be classified as a sign (and possibly further classified as a stop sign). This may be done by the vehicle's behavior system (e.g., behavior system 240 in FIG. 2 or 338 in FIG. 3A) or another part of the vehicle's computer system. Based on these classifications, the object trajectories associated with the pedestrian objects can be identified as paths taken by such pedestrian objects. For instance, as mentioned above, object trajectories may comprise a list or other set of positions and orientations or headings (e.g., poses) as well as other predicted characteristics such as speed, acceleration or deceleration, rate of change of acceleration or deceleration, etc.

By way of example, view 720 of FIG. 7B illustrates the pedestrian objects 706₁, 706₂ and 706₃ and corresponding trajectories 722₁, 722₂ and 722₃ based on the last few seconds or more of sensor data (e.g., the last 10-30 seconds or more), e.g., starting at time $t_0$ at a first location and continuing to current time $t_N$. The vehicle main continue to detect the positions of such objects so long as they remain in the sensor's (or sensors') field of view. Such further trajectories are shown by solid arrows 724 (from time $t_N$ to time $t_{N+1}$). Note that here pedestrian object 706₁ has not moved between time $t_N$ and time $t_{N+1}$.

The vehicle may maintain historical information on a rolling (e.g., first-in, first-out) basis for 10 seconds, 30 seconds, 60 seconds or more. Alternatively, it may maintain historical information for objects within some threshold distance (e.g., 100-250 meters) of the vehicle. How long or how far the historical information is maintained could vary for different object types. Thus, because pedestrian objects tend to move slower than bicycle objects or vehicle objects, the system may maintain historical information for such slower moving objects longer during a pickup scenario.

For each object classified as a pedestrian object or otherwise identified as a likely pedestrian object when an object classification model indicates a likelihood above a selected threshold, the object trajectory including the set of positions and other information may be stored as a pedestrian path. In an example, all such trajectories may be temporarily stored, but the system may only use those trajectories above an x % threshold when analyzing them to generate a heatmap (such as greater than a 75% or 90% likelihood threshold that the object is a pedestrian). The trajectories may be further refined with motion models or machine learning models to smooth out possible noise/sensor errors or occlusions that could cause the raw trajectories to be noisy. For instance, it would be unrealistic that a pedestrian would jerk 1 meter to the right and then to the left while walking, so a motion model or machine learning model could be employed, thereby attributing the positional jerk as a sensor error. In another example, a cyclist is unlikely to start reversing, so any such maneuver in a cyclist's trajectory would likely be sensor error as well. In additional or alternatively to the above, other perception data could be used to augment or refine the trajectory dataset beyond camera imagery or lidar point cloud data, such as radar or sonar signal returns, or audio information from acoustical sensors.

According to one aspect, while the system does not maintain personal details about the pedestrian object (e.g., no facial recognition information would be stored), each pedestrian object may be labeled as being a type of a pedestrian object. Thus, the system may label different pedestrian objects, according to the obtained sensor data and/or other information, as being a person who is walking, a jogger, a person with a stroller, a person in a wheelchair, a person using crutches or other assistance, a person carrying a package, a person pushing (or pulling) a handcart, a person toting luggage, a person riding a scooter, a person riding or walking a bike, a person riding a skateboard, etc. Such labeled pedestrian object types may be used when the vehicle or back-end system selects a pickup location for a rider, such as a rider that has indicated they will have a stroller or collapsible bicycle with them at pickup.

Other classified object classifications can also be relevant when identifying pickup or drop-off locations. For instance, different types of vehicles such as buses, vans, trucks or passenger cars may be separately classified. Such vehicles may be allowed to drive in different lanes or be restricted from using certain lanes (e.g., no trucks in a left lane, no passenger cars with less than 2 occupants in a high-occupancy vehicle lane during rush hour, etc.). Identification of such vehicle types can help the system with trajectory prediction of such objects, including where they may drive or pull over. This can help identify or eliminate certain places as pickup or drop-off locations for riders. In another aspect, client device information, such as GPS coordinates or WiFi or Bluetooth signals, could also be incorporated to help identify objects as pedestrians and/or to determine the trajectories of such objects. The suitability of such signals may vary due to their granularity or resolution (e.g., a signal accuracy within 0.5 meters may be helpful, but a signal accuracy on the order of 4-10 meters may be unhelpful). Client signals may be applied if the vehicle sensors are at least partly occluded or sensor data is noisy. Client signals may also be applied if the pickup or drop-off situation involves places not close to a road (e.g., a path between two roads, a waiting area more than X meters from a road section, etc.).

Historical Information

Once pedestrian objects have been detected and path information has been gathered, the vehicle may store such information in memory locally, such as in a log file, table or other array, or other format. This information may be used during a trip to update or suggest a certain pickup (or drop-off) location. Alternatively or additionally, during a trip or after a trip is completed, the pedestrian object path information may be downloaded or otherwise transmitted to a back-end server, such as a computer of a fleet management system (discussed further below). The path information, obtained from one or more vehicles, can be stored as aggregated pedestrian path information. Other data, such as map information which may be derived from satellite imagery, can be stored as detailed map data (e.g., roadgraphs). In one scenario, such data may be checked and/or cleaned up manually. The data may also be tagged or otherwise labeled. For instance, the path information may be labeled according to different types of pedestrians, because a person walking or pushing a stroller may take a different path than a person riding a bike or a scooter. Similarly, the roadgraph information may be labeled to indicate the presence (or absence) of a curb, whether a curb includes a ramp for accessibility, the presence of a crosswalk, etc.

The path information can be used by the system to generate one or more heat maps for a given area for possible pickup or drop-off locations. The system can compare the heat maps (or the path information by itself) against the map (e.g., satellite) information to identify pedestrian paths to be used to select the pickup or drop-off locations. In some instances, the heatmap(s) and the map information may each be used to identify the same location, or locations within a few meters of each other. In this case, the system may select a particular location or set of locations based on either the map information or the heatmap(s). In other instances, the heatmap(s) may indicate suitable locations that differ from the locations based on the map information, e.g., by tens of meters or more. Here, the system may select one or more pickup or drop-off locations based on only the heatmap(s), only the map information, or a combination thereof. By way of example, the system may rank a set of possible locations (e.g., 2-10 possible locations), weighting either the heatmap-based locations or the map information-based locations more heavily. For instance, should the heatmap(s) indicate a higher probability that a pedestrian will take a path to a location that differs from a location suggested by the map information, than the heatmap-based location(s) may be ranked higher than the map information-based locations.

By tagging or otherwise labeling the path information, the system can identify even higher quality locations for pickups and drop-offs. As noted above, the path information can be labeled for different types of pedestrian objects. It can also be tagged or otherwise labeled based on temporal and/or ambient information. For instance, the labeling may identify a time of day (e.g., early morning, rush hour, afternoon, evening, overnight, etc.), day of the week (e.g., weekday or weekend) and/or season (e.g., winter, spring, summer or fall). The ambient information could include labels for environmental conditions such as the presence of precipitation (e.g., rain, snow or fog), humidity, temperature (e.g., below freezing, between freezing and 60° F., warm temperatures above 60° F. but below 80° F., hot temperatures at or above 80° F., or the like), wind levels (e.g., winds below 5 mph, between 5-15 mph, between 15-25 mph, above 25 mph, or other ranges or levels) and amount of light (e.g., full sunlight, cloudy or partly sunny, or dark). These labels may be helpful when the system (e.g., a vehicle dispatched for a trip or the back-end fleet management system) is selecting a pickup or drop-off locations (or multiple options for such locations), for instance by matching one or more labels for a time of day, amount of light, precipitation, temperature and/or wind level against current conditions at or near the rider's area of interest. Any matches with the labels can be used to refine the location selection, for instance by identifying where people tend to go historically in view of the labeled factors. Thus, a rider requesting a pickup during a cold, snowy and windy day may be provided with one pickup location whereas a rider requesting a pickup for the same area during a warm, sunny summer afternoon might be provided with a different pickup location.

Example System Architecture

One example of a back-end system for fleet-type operation is shown in FIGS. 8A and 8B. In particular, FIGS. 8A and 8B are pictorial and functional diagrams, respectively, of an example system 800 that includes a plurality of computing devices 802, 804, 806, 808 and a storage system 810 connected via a network 816. System 800 also includes vehicles 812 and 814 configured to operate in an autonomous driving mode, which may be configured the same as or similarly to vehicles 100, 120, 140 and/or 160 of FIGS. 1A-E. Vehicles 812 and/or vehicles 814 may be parts of one or more fleets of vehicles that provide rides for passengers or deliver meals, groceries, cargo or other packages to customers. Although only a few vehicles and computing devices are depicted for simplicity, a typical system may include significantly more, such as tens or hundreds of vehicles. As shown in FIG. 8B, each of computing devices 802, 804, 806 and 808 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 816. The network 816 and any intervening nodes may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 812 and/or 814, as well as computing devices 804, 806 and 808 via the network 816. For example, vehicles 812 and/or 814 may be a part of a fleet of autonomous vehicles that can be dispatched by a server computing device to various locations. In this regard, the computing device 802 may function as a dispatching server computing system which can be used to dispatch vehicles to different locations in order to pick up and drop off passengers or to pick up and deliver cargo or other items. In addition, server computing device 802 may use network 816 to transmit and present information to a user of one of the other computing devices or a rider in a vehicle. In this regard, computing devices 804, 806 and 808 may be considered client computing devices.

As shown in FIGS. 8A-B each client computing device 804, 806 and 808 may be a personal computing device intended for use by a respective user 818, and have all of the components normally used in connection with a personal computing device including a one or more processors (e.g., a central processing unit (CPU), graphics processing unit (GPU) and/or tensor processing unit (TPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch), or a netbook that is capable of obtaining information via the Internet or other networks.

In some examples, client computing device 804 may be a remote assistance or other fleet management workstation used by an administrator, rider support operator or other personnel to communicate with riders of dispatched vehicles. Although only a single remote assistance workstation 804 is shown in FIGS. 8A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to help process sign-related, including labeling of different types of signs.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 816 as shown in FIGS. 8A-B, and/or may be directly connected to or incorporated into any of the computing devices.

Storage system 810 may store various types of information. This can include aggregated pedestrian path information, heatmaps from such path information and/or map information (e.g., based on satellite imagery). The storage system 810 may also store autonomous vehicle control software which is to be used by vehicles, such as vehicles 812 or 814, to operate such vehicles in an autonomous driving mode. Storage system 810 may have one or more models and data for training the models such as path-related data, imagery, parameter values for the model, a data structure of different training information such as labeled pedestrian trajectory information, etc. The storage system 810 may also store a training subsystem to train the model(s), as well as resultant information such as trained classifiers. The trained object classifiers may be shared with specific vehicles or across the fleet as needed. They may be updated in real time, periodically, or off-line as additional training input data is obtained. The storage system 810 can also include route information, weather information, etc. This information may be shared with the vehicles 812 and 814, for instance to help with operating the vehicles in an autonomous driving mode.

Pickup Location Adjustment Example

As noted above, a pickup location may be arranged when a user schedules a pickup by an autonomous vehicle. This can be done using an app on the user's mobile phone or other client device (e.g., tablet PC, smartwatch, etc.). As shown in view 900 of FIG. 9A, client device 902 has an app with a user interface 904, which can be used to schedule the trip with an autonomous vehicle ride hailing service. The person scheduling the trip may select a pickup spot. For instance, one part of the user interface 906 may ask where the rider would like to be picked up. The user may manipulate the user interface to select a spot, such as shown by icon 908 in a map display area of the user interface, and the user may confirm the spot via a button 910 or other selection option.

Prior to the actual pick up time, the vehicle or the back-end system may suggest a different pickup location.

While this may be due to traffic or other issues, it can also be based on pedestrian path information. For instance, as shown in view 920 of FIG. 9B, a suggested update may be sent by the vehicle or the backend system for presentation on the client device user interface. Here, a different pickup spot 922 is shown, with the original spot 908 in dashed lines. Message 924 indicates the suggestion for the alternative location. In view 940 of FIG. 9C, once the suggested pickup location is accepted (or rejected), turn-by-turn or other walking directions 942 (as shown by the dashed lines) may be presented in a map view 944 of the user interface, where the current or estimated location 946 of the rider is shown in relation to the vehicle at the pickup location 948. The rider may request navigation assistance from a rider support agent via button 950.

Data Normalization and Post Processing

Much of the pedestrian path information may be detected by vehicles in a fleet that drive along certain routes. A geographic area, such as a city or a group of suburban neighborhoods, may be divided into different segments such as tiles. Some tiles may have a much richer set of pedestrian path information than others. For instance, a first tile for one neighborhood or group of city blocks may have path information from hundreds or thousands of pedestrian trajectories, while an adjacent neighborhood or group of city blocks may only have path information from dozens of pedestrian trajectories. In order to account for this, the system may implement a normalization procedure so that the density of the path information in a given tile is relative to the amount of information associated with that tile. For example, each tile could be normalized by ensuring that each tile has n associated trajectories for each tile. In cases where there are more or less than n trajectories of data for that tile, the system can down-sample or up-sample to match.

Training a Pedestrian Object Model

Machine learning models for pedestrian objects, which may include neural networks, can be trained on "ground truth" data associated with a pickup location, geolocation data of riders, perception information from a vehicle (or a fleet of vehicles) and/or the vehicle location itself. This may be done for different types of pickup scenarios, both with and without other nearby objects (e.g., cars or other vehicles on the roadway, non-rider pedestrians or bicyclists on sidewalks, etc.). The training may be based on gathered real-world data as discussed above (e.g., that is labeled according to pedestrian type, road environment, intersection type, the presence of sidewalks, signage such as stop or yield signs, ambient conditions, etc.).

From this, one or more models may be developed and used in real-time by the autonomous vehicles, after the fact (e.g., post-processing) evaluation by a back-end system, or both. This can include a rider pickup model for detected pedestrian objects that is used to select a suitable pickup (or drop-off) location that may be optimized based on pedestrian path heatmap information. By way of example, the model structure may be a deep net, where the exact structure and parameters can be searched through automated machine learning, e.g., using a Neural Architecture Search (NAS) type model. Based on this, the onboard system (e.g., planner system, routing system and/or the behavior system of the vehicle's autonomous driving system) can utilize the model(s) to evaluate detected pedestrian objects and handle pickup (and drop-off) situations accordingly. This can include creating a ranked list of possible pickup (or drop-off) locations for a given trip. In addition to pedestrian path (heatmap) information, the training data may also include highly detailed map information such as roadgraph data. The model can be trained with any combination of such information.

Once the model is trained, it can be used by the vehicle or the backend system in different ways. For example, the vehicle may use the model to predict how each pedestrian object of interest will move over the next few seconds (e.g., the next 2-10 seconds), such as by generating a set of one or more predicted paths for each pedestrian object of interest. Here, given the path observed by the perception system, the vehicle could determine what the trajectory would be for that pedestrian object. This can include generating a likelihood value or composite score that the person associated with that pedestrian object would walk to the vehicle (e.g., a percentage value or a ranking on a scale such as 0-4).

The vehicle or the backend system may also use the model to perform a back evaluation, matching the detected or otherwise obtained information to a most likely path. Here, knowing where a given pedestrian object is at a specific location in time, the system may work backwards to determine where that pedestrian object came from. If this process indicates that the object came from a particular place, the system may use this to predict a spot where the rider is likely to head towards, and select a pickup location accordingly. The back evaluation approach can also be used to identify how useful the heatmap information is for suggested modifications to a pickup (or drop-off) location.

Direct Communication

In another scenario, when the rider is close to the vehicle (e.g., within a block or under 150 meters), the vehicle's computing system may determine from the above processes that a different pickup location would be more suitable for the rider. Here, the system may enable direct communication between the rider's client device and the vehicle's onboard communication system without routing information via a back-end ridesharing service, such as via an ad hoc communication link (e.g., Bluetooth), a WiFi link, or a cellular communication connection. This can reduce possible communication delays that may occur when routing via the back-end system. The direct communication could include telling the rider that their vehicle is adjusting the place where they will be picked up.

While certain use cases described above focus on rider pickup situations in the ride hailing context, the technology may be used in many other situations. This can include delivery situations, where the person going to the vehicle may be a restaurant or store employee loading the vehicle with a meal, groceries, prescription or another type of package. Or the person may be the customer who is retrieving the package from the vehicle. Similarly, in a trucking scenario, the person or people heading to the vehicle could be warehouse workers that will load or unload the truck with cargo, or that need to transfer cargo to or from the truck (e.g., a mail delivery truck). The person heading to the vehicle in each of these situations can benefit from the approaches discussed herein.

And alternative to ridesharing, the technology may be used in a personal car ownership situation. For instance, the autonomous vehicle may have dropped off its owner at a particular location (their office, gym, grocery store, etc.) and then parked at an available spot in view of the technology described above. Here, the system could identify when their owner is walking toward the vehicle and indicate to them where to meet their vehicle.

FIG. 10 illustrates a flow diagram 1000 according to one aspect of the technology, which provides a method for identifying pickup or drop-off locations. At block 1002 the method includes obtaining, by one or more processors of a computing system, digital map information for a location of interest associated with a pickup or a drop-off for a rider, in which the digital map information includes road segment data. At block 1004 the one or more processors obtain sensor data from at least one vehicle for the location of interest, the sensor data including a set of objects. At block 1006 the processors analyze the obtained sensor data to classify whether the set of objects includes one or more pedestrian objects. At block 1008 the processors generate a heatmap of pedestrian walking paths based on trajectory information for objects classified as pedestrian objects. At block 1010 the processors compare the digital map information for the location of interest to the heatmap of pedestrian walking paths to identify at least one location to perform the pickup or the drop-off for the rider. And at block 1012 the processors perform an action upon identifying the at least one location to perform the pickup or the drop-off for the rider.

Finally, the technology provides enhanced flexibility to preposition one or more vehicles of a fleet. This may be done to reduce how long it takes each vehicle to arrive at the selected destination for each respective pickup. In addition, the fleet management system may instruct certain vehicles to position themselves at particular locations to improve sensor coverage across a group of vehicles. This could help the system obtain rich historical information for heatmap evaluation.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method comprising:
  generating, by one or more processors of a computing system associated with a fleet of vehicles configured to operate in an autonomous driving mode, a heatmap of detected pedestrian walking paths based on sensor data corresponding to a location for a pickup or drop-off request, the sensor data being indicative of detected trajectory information for pedestrian objects;
  comparing, by the one or more processors, digital map information corresponding to the pickup or drop-off request to the heatmap of detected pedestrian walking paths to identify at least one location for the pickup or drop-off request;
  responsive to the comparing, selecting, by the one or more processors, a given location of the at least one location; and
  causing, by the one or more processors, a vehicle of the fleet of vehicles to perform a driving operation in order to arrive at the given location.

2. The method of claim 1, further comprising, transmitting information to a client device of a rider, the information identifying the given location.

3. The method of claim 1, wherein the digital map information includes one or more of intersection information, crosswalk placement, bicycle lane information, traffic signals information, or pullover zones information.

4. The method of claim 1, wherein the sensor data is historical sensor data obtained from previously taken trips.

5. The method of claim 1, further comprising obtaining, by the one or more processors from at least one of the fleet of vehicles, at least some of the sensor data in real time.

6. The method of claim 1, wherein the detected trajectory information includes a set of positions for at least one of the pedestrian objects at different points in time.

7. The method of claim 1, wherein the detected trajectory information includes, for at least one of the pedestrian objects, one or more of pose information, speed, acceleration, deceleration, or a rate of change of the acceleration or the deceleration.

8. The method of claim 1, wherein generating the heatmap of detected pedestrian walking paths is based on trajectory information for one or more of the pedestrian objects above a threshold probability.

9. The method of claim 1, wherein generating the heatmap of detected pedestrian walking paths includes performing a noise-smoothing operations on the detected trajectory information.

10. The method of claim 1, wherein comparing the digital map information to the heatmap of detected pedestrian walking paths includes:
  identifying a first set of possible locations based on the digital map information but not the heatmap of detected pedestrian walking paths;
  identifying a second set of possible locations based on the heatmap of detected pedestrian walking paths but not on the digital map information; and
  determining one or more common locations between the first and second sets of possible locations.

11. The method of claim 10, wherein selecting the given location of the at least one location includes:
  responsive to determining the one or more common locations, selecting one of the one or more common locations as the given location; and
  responsive to determining no common locations between the first and second sets of possible locations, selecting at least one of the second set of possible locations as the given location.

12. The method of claim 1, wherein comparing the digital map information to the heatmap of detected pedestrian walking paths includes:
  identifying a first set of possible locations based on the digital map information but not the heatmap of detected pedestrian walking paths;
  identifying a second set of possible locations based on the heatmap of detected pedestrian walking paths but not on the digital map information; and
  weighting the second set of possible locations more heavily than the first set of possible locations.

13. The method of claim 1, further comprising:
  labeling the detected trajectory information according to at least one of temporal information or ambient information;
  wherein selecting the given location is based on the labeled detected trajectory information.

14. The method of claim 13, wherein selecting the given location further includes matching labeled detected trajectory information against a set of current conditions for the pickup or drop-off request.

15. A vehicle configured to operate in an autonomous driving mode, the vehicle comprising:
  a perception system including one or more sensors, the one or more sensors being configured to receive sensor data associated with objects in an external environment of the vehicle;
  a driving system including a steering subsystem, an acceleration subsystem and a deceleration subsystem to control driving of the vehicle;

a positioning system configured to determine a current position of the vehicle; and a control system including one or more processors, the control system operatively coupled to the driving system, the perception system and the positioning system, the control system being configured to, in association with operating the vehicle in the autonomous driving mode:

generate a heatmap of detected pedestrian walking paths based on sensor data corresponding to a location for a pickup or drop-off request, the sensor data being indicative of detected trajectory information for pedestrian objects;

compare digital map information corresponding to the pickup or drop-off request to the heatmap of detected pedestrian walking paths to identify at least one location for the pickup or drop-off request;

select, based on the comparison, a given location of the at least one location; and responsive to selection of the given location, perform a driving operation of the vehicle in order to arrive at the given location.

16. The vehicle of claim 15, wherein the control system is further configured to, responsive to the selection of the given location, transmit information to a client device of a rider, the information identifying the given location.

17. The vehicle of claim 15, wherein the sensor data is at least one of camera imagery or lidar data.

18. A computing system, comprising:

memory configured to store:

digital map information corresponding to a pickup or drop-off request; and sensor data corresponding to a location for the pickup or drop-off request, the sensor data being indicative of detected trajectory information for pedestrian objects; and one or more processors associated with a fleet of vehicles configured to operate in an autonomous driving mode and operatively coupled to the memory, the one or more processors being configured to:

generate a heatmap of detected pedestrian walking paths based on the detected trajectory information;

compare the digital map information to the heatmap of detected pedestrian walking paths to identify at least one location for the pickup or drop-off request;

provide at least one of the heatmap of detected pedestrian walking paths or the at least one location to one or more vehicles of the fleet of vehicles; and enable at least one of the one or more vehicles to perform a driving operation based on the at least one of the heatmap of detected pedestrian walking paths or the at least one location.

19. The computing system of claim 18, wherein the one or more processors are configured to analyze the sensor data using one or more machine learning models trained to identify different types of objects.

20. The computing system of claim 19, wherein the one or more processors are configured to apply labels to the identified different types of objects.

* * * * *